US011412221B2

(12) United States Patent
Liao et al.

(10) Patent No.: US 11,412,221 B2
(45) Date of Patent: Aug. 9, 2022

(54) METHOD AND APPARATUS FOR MOTION FIELD STORAGE IN TRIANGLE PARTITION MODE AND GEOMETRIC PARTITION MODE

(71) Applicant: ALIBABA GROUP HOLDING LIMITED, George Town (KY)

(72) Inventors: Ru-Ling Liao, San Mateo, CA (US); Yan Ye, San Mateo, CA (US); Jie Chen, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/880,245

(22) Filed: May 21, 2020

(65) Prior Publication Data
US 2020/0404267 A1    Dec. 24, 2020

Related U.S. Application Data

(60) Provisional application No. 62/865,920, filed on Jun. 24, 2019.

(51) Int. Cl.
*H04N 11/02* (2006.01)
*H04N 19/119* (2014.01)
(Continued)

(52) U.S. Cl.
CPC ......... *H04N 19/119* (2014.11); *H04N 19/124* (2014.11); *H04N 19/176* (2014.11); *H04N 19/52* (2014.11)

(58) Field of Classification Search
CPC .................................................. H04N 19/119
(Continued)

(56) References Cited

U.S. PATENT DOCUMENTS

2013/0266070 A1\* 10/2013 Sato ..................... H04N 19/119
375/240.16
2017/0289566 A1\* 10/2017 He ......................... H04N 19/52
(Continued)

FOREIGN PATENT DOCUMENTS

WO    WO 2019/002215 A1    1/2019
WO    WO 2019/099444 A1    5/2019
(Continued)

OTHER PUBLICATIONS

International Telecommunications Union "Series H: Audiovisual and Multimedia Systems Infrastructure of audiovisual services—Coding of moving video", ITU-T Telecommunication Standardization Sector of ITU, Apr. 2013, 317 pages.
(Continued)

*Primary Examiner* — Leron Beck
(74) *Attorney, Agent, or Firm* — Finnegan, Henderson, Farabow, Garrett & Dunner, LLP

(57) ABSTRACT

The present disclosure provides method and apparatus for motion field storage in video coding. An exemplary method includes: determining whether a first uni-prediction motion vector for a first partition of a block and a second uni-prediction motion vector for a second partition of the block are from a same reference picture list; and in response to the first uni-prediction motion vector and the second uni-prediction motion vector being determined to be from the same reference picture list, storing, in a motion field of the block, one of the first uni-prediction motion vector and the second uni-prediction motion vector for a subblock located in a bi-predicted area of the block.

19 Claims, 18 Drawing Sheets

(51) Int. Cl.
  *H04N 19/124*  (2014.01)
  *H04N 19/52*   (2014.01)
  *H04N 19/176*  (2014.01)
(58) Field of Classification Search
  USPC ........................................ 375/240.01–240.29
  See application file for complete search history.

(56) References Cited

U.S. PATENT DOCUMENTS

2020/0029087 A1* 1/2020 Lim ..................... H04N 19/119
2020/0195973 A1* 6/2020 Xu ....................... H04N 19/105

FOREIGN PATENT DOCUMENTS

WO   WO 2020/073896 A1   4/2020
WO   WO 2020/094073 A1   5/2020

OTHER PUBLICATIONS

Sullivan et al., "Overview of the High Efficiency Video Coding (HEVC) Standard," IEEE Transactions on Circuits and Systems for Video Technology, vol. 22, No. 12, pp. 1649-1668, Dec. 2012.
Chen et al. "Algorithm description of Joint Exploration Test Model 7 (JEM7)", Joint Video Exploration Team (JVET), JVET-G1001, 7th Meeting: Torino, IT, Jul. 13-21, 2017, .48 pages.
Segall, "Joint Call for Proposals on Video Compression with Capability beyond HEVC," Joint Video Experts Team (JVET), JVET-H1002, 8th Meeting: Macao, CN, Oct. 18-24, 2017, 27 pages.
Bross et al. "Versatile Video Coding (draft 5)", Joint Video Experts Team (JVET), JVET-N1001, 14th Meeting: Geneva, CH, Mar. 19-27, 2019, 406 pages.
Chen et al. "Algorithm description for Versatile Video Coding and Test Model 5 (VTM 5)," Joint Video Experts Team (JVET), 14th Meeting: Geneva, CH, Mar. 19-27, 2019, JVET-N1002, Mar. 2019, 76 pages.
PCT International Search Report and Written Opinion dated Aug. 7, 2020, issued in corresponding International Application No. PCT/US2020/033965 (10 pgs.).
European Patent Office Communication issued for Application No. 20830706.6 which encloses the extended European Search Report which includes pursuant to Rule 62 EPC, the Supplementary European Search Report (Art. 153(7) EPC) and the European search opinion, dated Jun. 2, 2022, 15 pages.
Blaser, Max, "CE10-related: Bi-directional motion vector storage for triangular prediction," JVET-M0581, $13^{th}$ Meeting: Marrakech, MA, Jan. 9-18, 2019, 4 pages.
Hsiao et al., "CE2-related: Simplifications for inherited affine candidates," JVET-M0168, $13^{th}$ Meeting: Marrakech, MA Jan. 9-18, 2019, 8 pages.
Liao, Ru-Ling, "CE10.3.1.b: Triangular prediction unit mode," JVET-L0124, $12^{th}$ Meeting: Macao, CN, Oct. 3-12, 2018, 8 pages.
Liao et al., "Non-CE4: Simplification of motion field for triangle partition," JVET-O0629, $15^{th}$ Meeting: Gothenburg, SE, Jul. 3-12, 2019, 10 pages.
Wang et al., "CE4-related: Non-square compression unit for temporal motion data storage," JVET-M0346, $13^{th}$ Meeting: Marrakech, MA Jan. 9-18, 2019, 4 pages.
Xiu et al., CE4-related: One simplified design of advanced temporal motion vector prediction (ATMVP), JVET-K0346, $11^{th}$ Meeting: Ljubljana, SI, Jul. 10-18, 2018, 5 pages.

\* cited by examiner

Triangle Partition Based Inter Prediction

600

| Merge Index | L0 MV | L1 MV |
|---|---|---|
| 0 | × | |
| 1 | | × |
| 2 | × | |
| 3 | | × |
| 4 | × | |

Uni-Prediction MV Selection For Partition Mode

FIG. 6

Examples Of The 4x4 Subblocks Located In The Uni-Predicted Or Bi-Predicted Area

An Example Of Angle Distribution Of GPM

Examples Of Distance Distribution Of GPM

Examples Of The 8x8 Subblocks Located In The Uni-Predicted Or Bi-Predicted Area

1200

Determine whether a subblock of a block is in a bi-predicted area, at least one of a width and a height of the subblock being larger than 4 — 1202

In response to the subblock being determined to be in the bi-predicted area, store a bi-prediction motion vector — 1204

FIG. 12

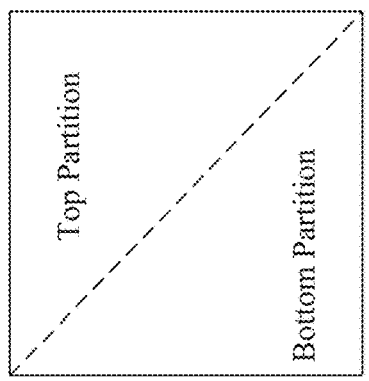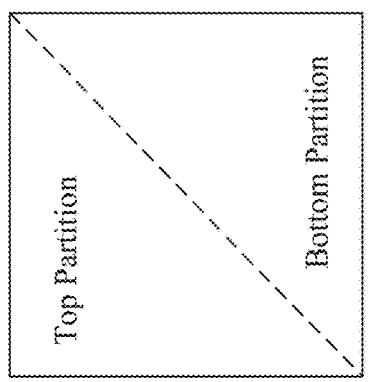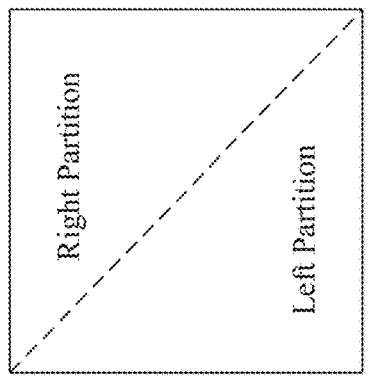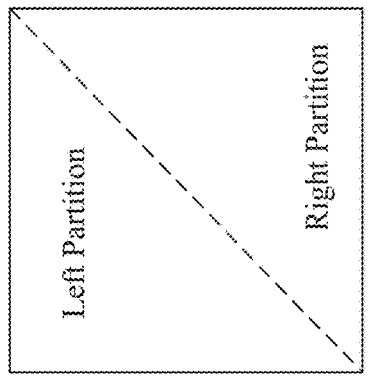
Triangle Partition
FIG. 13

1400

```
┌─────────────────────────────────────┐
│ Determine whether a first uni-prediction motion │
│ vector for a first partition of a block and a second uni- │─── 1402
│ prediction motion vector for a second partition of the │
│ block are from a same reference picture list │
└─────────────────────────────────────┘
                    │
                    ▼
┌─────────────────────────────────────┐
│ In response to the first uni-prediction motion vector │
│ and the second uni-prediction motion vector being │
│ determined to be from the same reference picture list, │─── 1404
│ store one of the first uni-prediction motion vector and │
│ the second uni-prediction motion vector for a │
│ subblock located in a bi-predicted area of the block │
└─────────────────────────────────────┘
```

```
Determine whether a first uni-prediction motion
vector for a first partition of a block and a second uni-
prediction motion vector for a second partition of the
block are from a same reference picture list
```
— 1502

↓

```
In response to the first uni-prediction motion vector
and the second uni-prediction motion vector being
determined to be from the same reference picture list,
store an averaged motion vector of the first uni-
prediction motion vector and the second uni-
prediction motion vector for a subblock located in a
bi-predicted area of the block
```
— 1504

FIG. 15

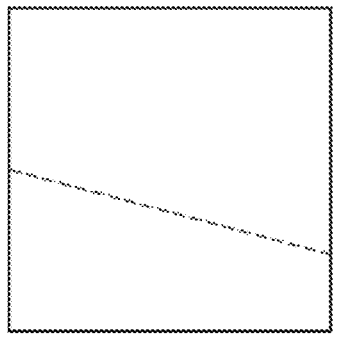
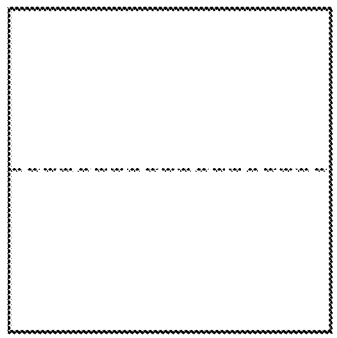
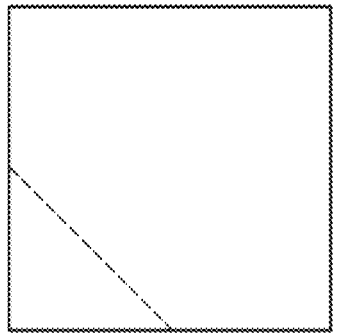
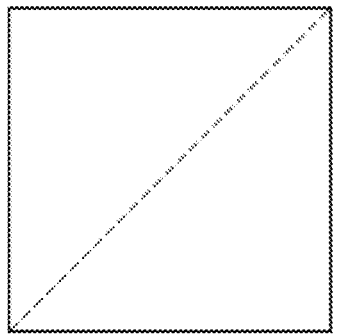
Examples Of Geometric Partition
FIG. 17

An Example Of Subblock Positions

METHOD AND APPARATUS FOR MOTION FIELD STORAGE IN TRIANGLE PARTITION MODE AND GEOMETRIC PARTITION MODE

CROSS-REFERENCE TO RELATED APPLICATIONS

The present disclosure claims priority to U.S. Provisional Application No. 62/865,920, filed on Jun. 24, 2019, which is incorporated herein by reference in its entirety.

TECHNICAL FIELD

The present disclosure generally relates to video data processing, and more particularly, to a method and an apparatus for performing motion field storage in video coding.

BACKGROUND

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

SUMMARY OF THE DISCLOSURE

The embodiments of the present disclosure provide method and apparatus for motion field storage. In some embodiments, an exemplary method includes: determining whether a first uni-prediction motion vector for a first partition of a block and a second uni-prediction motion vector for a second partition of the block are from a same reference picture list; and in response to the first uni-prediction motion vector and the second uni-prediction motion vector being determined to be from the same reference picture list, storing, in a motion field of the block, one of the first uni-prediction motion vector and the second uni-prediction motion vector for a subblock located in a bi-predicted area of the block.

In some embodiments, an exemplary apparatus includes: a memory configured to store instructions; and a processor coupled to the memory. The processor can be configured to execute the instructions to cause the apparatus to: determine whether a first uni-prediction motion vector for a first partition of a block and a second uni-prediction motion vector for a second partition of the block are from a same reference picture list; and in response to the first uni-prediction motion vector and the second uni-prediction motion vector being determined to be from the same reference picture list, store, in a motion field of the block, one of the first uni-prediction motion vector and the second uni-prediction motion vector for a subblock located in a bi-predicted area of the block.

In some embodiments, an exemplary non-transitory computer-readable storage medium stores a set of instructions. The set of instructions are executable by one or more processors of a device to cause the device to perform: determining whether a first uni-prediction motion vector for a first partition of a block and a second uni-prediction motion vector for a second partition of the block are from a same reference picture list; and in response to the first uni-prediction motion vector and the second uni-prediction motion vector being determined to be from the same reference picture list, storing, in a motion field of the block, one of the first uni-prediction motion vector and the second uni-prediction motion vector for a subblock located in a bi-predicted area of the block.

BRIEF DESCRIPTION OF THE DRAWINGS

Embodiments and various aspects of the present disclosure are illustrated in the following detailed description and the accompanying figures. Various features shown in the figures are not drawn to scale.

FIG. 6 illustrates a schematic diagram of an exemplary uni-prediction motion vector selection for partition mode, according to some embodiments of the present disclosure.

FIG. 12 illustrates a flowchart of an exemplary method for motion field storage, according to some embodiments of the present disclosure.

FIG. 13 is a schematic diagram illustrating examples of triangle partition, according to some embodiments of the present disclosure.

FIG. 14 illustrates a flowchart of an exemplary method for motion vector generation, according to some embodiments of the present disclosure.

FIG. 15 illustrates a flowchart of another exemplary method for motion vector generation, according to some embodiments of the present disclosure.

FIG. 17 is a schematic diagram illustrating examples of geometric partition, according to some embodiments of the present disclosure.

DETAILED DESCRIPTION

Figure 1:
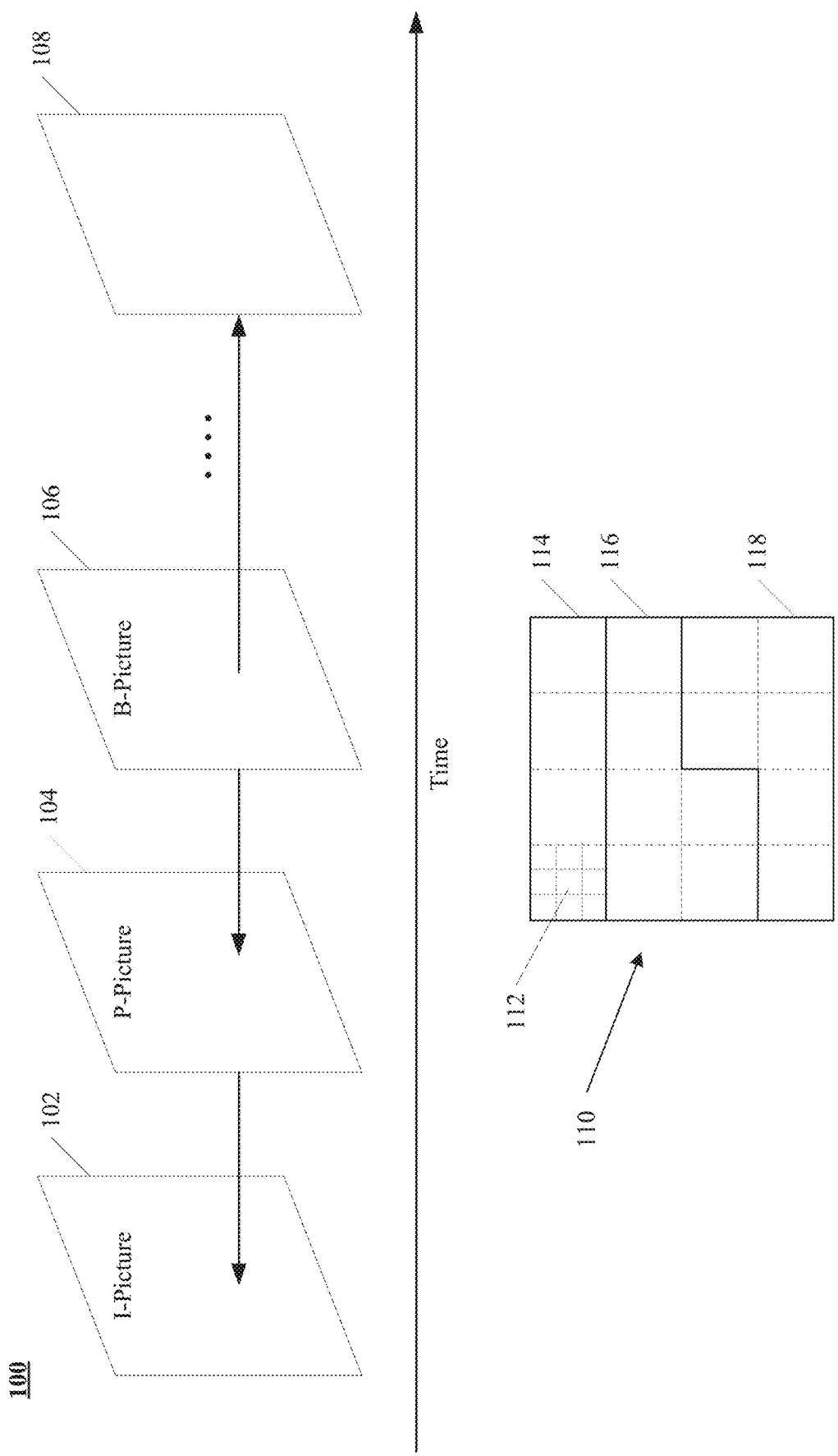
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC. The VCEG and MPEG have also formally started the development of next generation video compression standard beyond HEVC.

The VVC standard continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Figure 2:
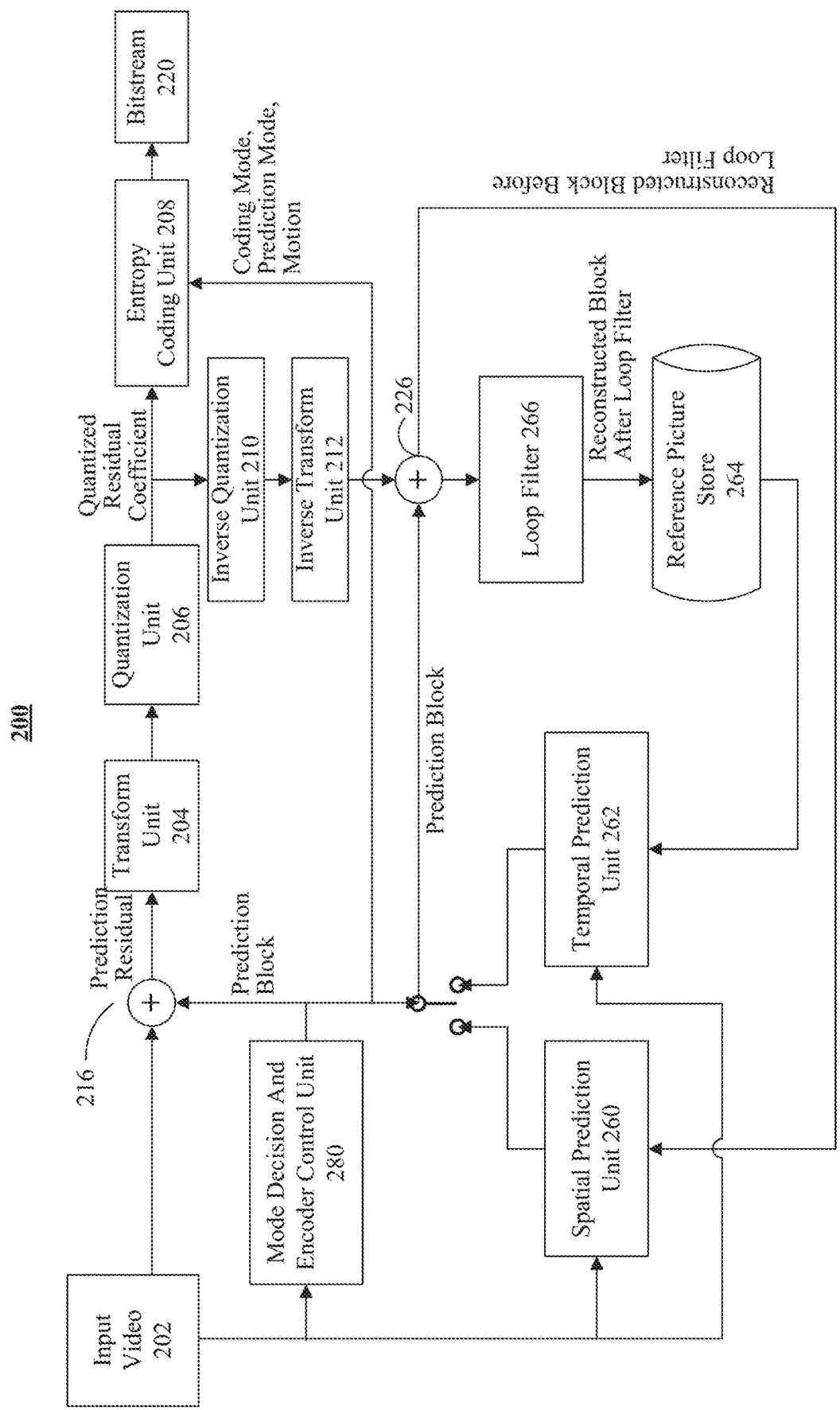
FIG. 2 is a schematic diagram illustrating an exemplary encoder in a hybrid video coding system, according to some embodiments of the present disclosure.
Figure 3:
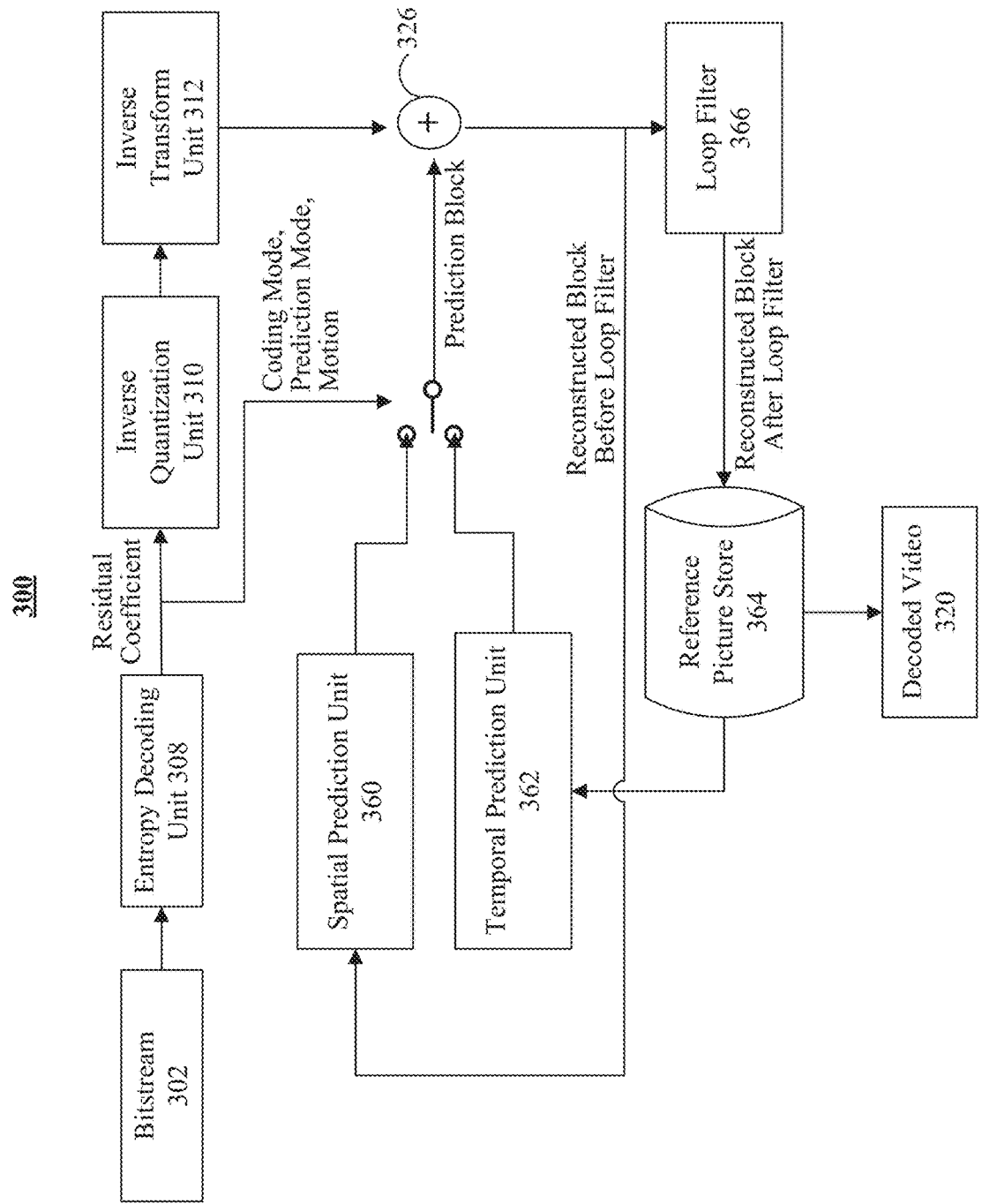
FIG. 3 is a schematic diagram illustrating an exemplary decoder in a hybrid video coding system, according to some embodiments of the present disclosure.

Video coding has multiple stages of operations, examples of which are shown in FIG. 2 and FIG. 3. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which is shown in FIG. 2), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIG. 2), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIG. 2), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2 illustrates a schematic diagram of an exemplary encoder 200 in a hybrid video coding system, according to some embodiments of the present disclosure. Video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes. Inter modes (such as uni-prediction or bi-prediction) may refer to a number of temporal-based compression modes.

Referring to FIG. 2, input video signal 202 may be processed block by block. For example, the video block unit may be a 16×16 pixel block (e.g., a macroblock (MB)). The size of the video block units may vary, depending on the coding techniques used, and the required accuracy and efficiency. In HEVC, extended block sizes (e.g., a coding tree unit (CTU)) may be used to compress video signals of resolution, e.g., 1080p and beyond. In HEVC, a CTU may include up to 64×64 luma samples corresponding chroma samples, and associated syntax elements. In VVC, the size of a CTU may be further increased to include 128×128 luma samples, corresponding chroma samples, and associated syntax elements. A CTU can be further divided into coding units (CUs) using, for example, quad-tree, binary tree, or ternary tree. A CU may be further partitioned into prediction units (PUs), for which separate prediction methods may be applied. Each input video block may be processed by using spatial prediction unit 260 or temporal prediction unit 262.

Spatial prediction unit 260 performs spatial prediction (e.g., intra prediction) to the current block/CU using information on the same picture/slice containing the current block. Spatial prediction may use pixels from the already coded neighboring blocks in the same video picture frame/slice to predict the current video block. Spatial prediction may reduce spatial redundancy inherent in the video signal.

Temporal prediction unit 262 performs temporal prediction (e.g., inter prediction) to the current block using information from picture(s)/slice(s) different from the picture/slice containing the current block. Temporal prediction for a video block may be signaled by one or more motion vectors. In uni-directional temporal prediction, only one motion vector indicating one reference picture is used to generate the prediction signal for the current block. On the other hand, in bi-directional temporal prediction, two motion vectors, each indicating a respective reference picture, can be used to generate the prediction signal for the current block. The motion vectors may indicate the amount and the direction of motion between the current block and one or more associated block(s) in the reference frames. If multiple reference pictures are supported, one or more reference picture indices may be sent for a video block. The one or more reference indices may be used to identify from which reference picture(s) in the reference picture store or decoded picture buffer (DPB) 264, the temporal prediction signal may come.

Mode decision and encoder control unit 280 in the encoder may choose the prediction mode, for example, based on rate-distortion optimization. Based on the determined prediction mode, the prediction block can be obtained. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed residual may be added to the prediction block at adder 226 to form the reconstructed video block. The reconstructed video block before loop-filtering may be used to provide reference samples for intra prediction.

The reconstructed video block may go through loop filtering at loop filter 266. For example, loop filtering such as deblocking filter, sample adaptive offset (SAO), and adaptive loop filter (ALF) may be applied. The reconstructed block after loop filtering may be stored in reference picture store 264 and can be used to provide inter prediction reference samples for coding other video blocks. To form the output video bitstream 220, coding mode (e.g., inter or intra), prediction mode information, motion information, and quantized residual coefficients may be sent to the entropy coding unit 208 to further reduce the bit rate, before the data are compressed and packed to form bitstream 220.

FIG. 3 illustrates a schematic diagram of an exemplary decoder 300 in a hybrid video coding system, according to some embodiments of the present disclosure. Referring to FIG. 3, a video bitstream 302 may be unpacked or entropy decoded at entropy decoding unit 308. The coding mode information can be used to determine whether the spatial prediction unit 360 or the temporal prediction unit 362 is to be selected. The prediction mode information can be sent to the corresponding prediction unit to generate the prediction block. For example, motion compensated prediction may be applied by the temporal prediction unit 362 to form the temporal prediction block.

The residual coefficients may be sent to inverse quantization unit 310 and inverse transform unit 312 to obtain the reconstructed residual. The prediction block and the reconstructed residual can be added together at 326 to form the reconstructed block before loop filtering. The reconstructed block may then go through loop filtering at loop filer 366. For example, loop filtering such as deblocking filter, SAO, and ALF may be applied. The reconstructed block after loop filtering can then be stored in reference picture store 364. The reconstructed data in the reference picture store 364 may be used to obtain decoded video 320, or used to predict future video blocks. Decoded video 320 may be displayed on a display device, such as a TV, a PC, a smartphone, or a tablet to be viewed by the end-users.

Figure 4:
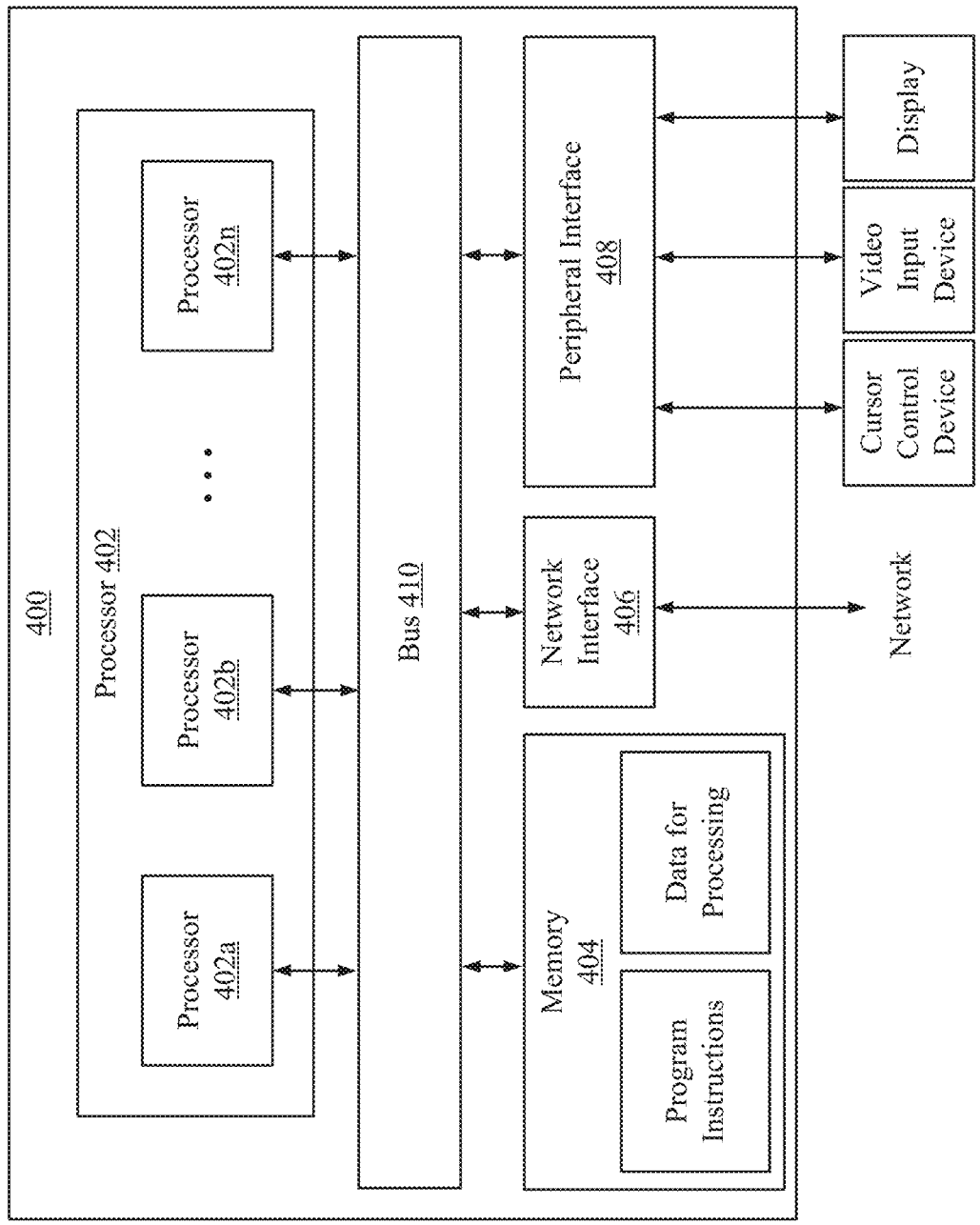
FIG. 4 illustrates a block diagram of an exemplary apparatus for encoding or decoding a video, according to some embodiments of the present disclosure.

FIG. 4 is a block diagram of an exemplary apparatus 400 for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in FIG. 2 or FIG. 3) and data for processing. Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in the present disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs can be implemented as any combination of any software or hardware modules in apparatus 400. For example, some or all stages of encoder 200 of FIG. 2 or decoder 300 of FIG. 3 can be implemented as one or more software modules of apparatus 400, such as program instructions that can be loaded into memory 404. For another example, some or all stages of encoder 200 of FIG. 2 or decoder 300 of FIG. 3 can be implemented as one or more hardware modules of apparatus 400, such as a specialized data processing circuit (e.g., an FPGA, an ASIC, an NPU, or the like).

In VTM5, a triangle partition mode is supported for inter prediction. The triangle partition mode is generally applied to CUs that are 8×8 or larger and are coded in a triangle skip or merge mode. A triangle skip/merge mode is signalled in parallel to a regular merge mode, Merge with Motion Vector Difference (MMVD) mode, Combined Inter and Intra Prediction (CIIP) mode or a subblock merge mode.

Figure 5:
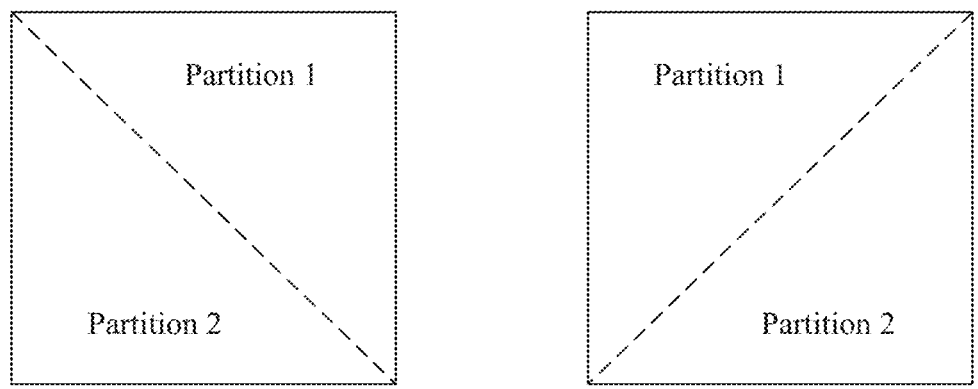
FIG. 5 is a schematic diagram illustrating examples of triangle partitions based inter prediction, according to some embodiments of the present disclosure.

When triangle partition mode is used, a CU is split evenly into two triangle-shaped partitions, using either the diagonal split or the anti-diagonal split. FIG. 5 illustrates some examples of triangle partitions based inter prediction, according to some embodiments of the present disclosure. Each triangle partition in the CU is inter-predicted using its own motion. Uni-prediction is allowed for each partition. Therefore, each partition has one motion vector and one reference index. The uni-prediction motion constraint is applied to ensure that same as the conventional bi-prediction, two motion compensated prediction are needed for each CU. The uni-prediction motion for each partition is derived directly from the merge candidate list constructed for extended merge prediction, and the selection of a uni-prediction motion from a given merge candidate in the list may be according to the procedure described below.

If triangle partition mode is used for a current CU, then a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU, and transform and quantization process can be applied to the whole CU as in other prediction modes. Then, the motion field of a CU predicted using the triangle partition mode is stored in 4×4 subblocks.

Given a merge candidate index, the uni-prediction motion vector is derived from the merge candidate list constructed for extended merge prediction. FIG. 6 illustrates an exemplary uni-prediction motion vector selection 600 for partition mode, according to some embodiments of the present disclosure. In some embodiments, uni-prediction motion vector selection 600 can be applied to triangle partition mode. For a candidate in the list, its LX motion vector with X equal to the parity of the merge candidate index value, is used as the uni-prediction motion vector for triangle partition mode. These motion vectors are marked with "x" in FIG. 6. In case a corresponding LX motion vector does not exist, the L(1−X) motion vector of the same candidate in the extended merge prediction candidate list is used as the uni-prediction motion vector for triangle partition mode.

After predicting each triangle partition using its own motion, blending is applied to the two prediction signals to derive samples around the diagonal or anti-diagonal edge. The following weights are used in the blending process:

{7/8, 6/8, 5/8, 4/8, 3/8, 2/8, 1/8} for luma and {6/8, 4/8, 2/8} for chroma.

Figure 7:
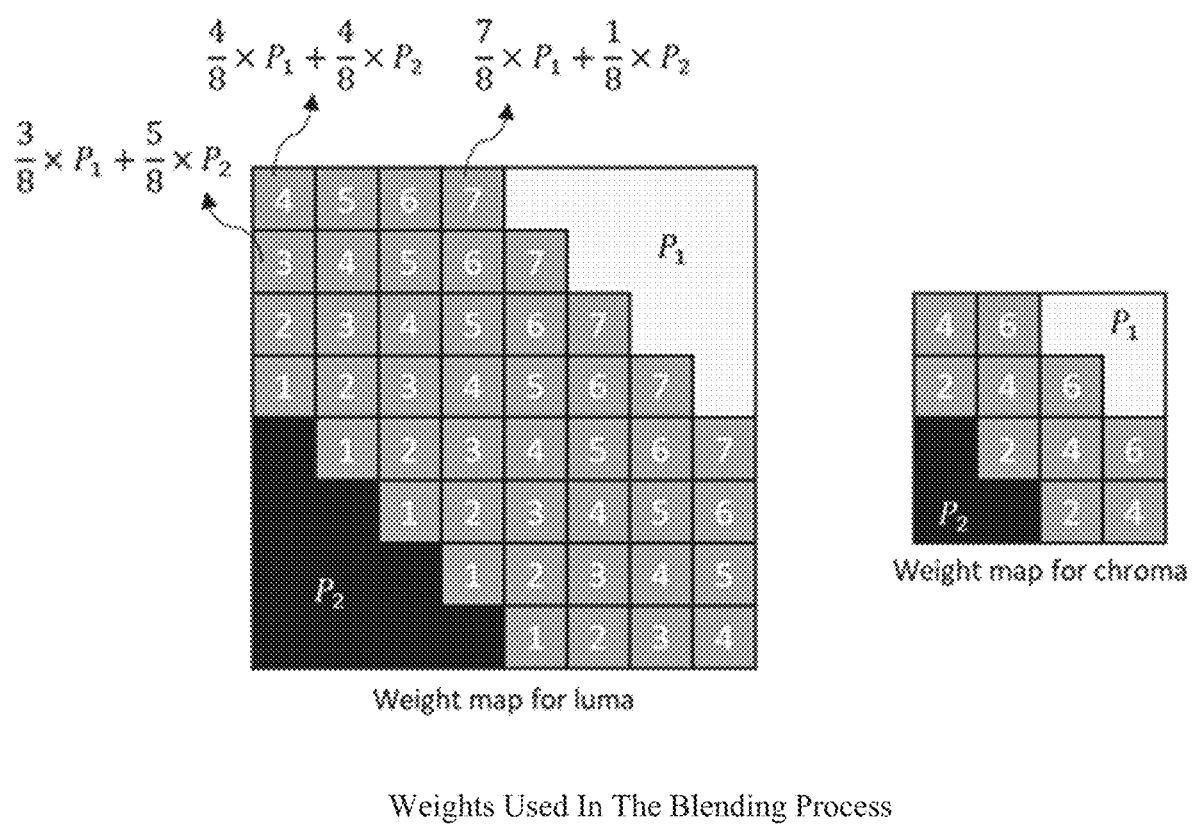
FIG. 7 is a schematic diagram illustrating exemplary weights for a blending process, according to some embodiments of the present disclosure.

FIG. 7 illustrates the exemplary weights above for a blending process 700, according to some embodiments of the present disclosure.

Motion vectors of a CU coded in triangle partition mode are stored in 4×4 subblocks. Depending on the position of each 4×4 subblock, either uni-prediction or bi-prediction motion vectors are stored. Denote Mv1 and Mv2 as uni-prediction motion vectors for partition 1 and partition 2, for example, as shown in FIG. 5, respectively. If a 4×4 subblock is located in the uni-predicted area, either Mv1 or Mv2 is stored for that 4×4 subblock. Otherwise, if the 4×4 subblock is located in the bi-predicted area, a bi-prediction motion vector is stored. The bi-prediction motion vector is derived from Mv1 and Mv2 according to the following process:

1. If Mv1 and Mv2 are from different reference picture lists (e.g., one from L0 and the other from L1), then Mv1 and Mv2 are simply combined to form the bi-prediction motion vector;
2. Otherwise, if Mv1 and Mv2 are from the same list, and without loss of generality, assume they are both from L0. In this case,
   2.1 If reference picture of either Mv2 (or Mv1) appears in L1, then that Mv2 (or Mv1) is converted to a L1 motion vector using that reference picture in L1. Then the two motion vectors are combined to form the bi-prediction motion vector;
   2.2 Otherwise, instead of bi-prediction motion, uni-prediction motion Mv1 is stored.

Figure 8:
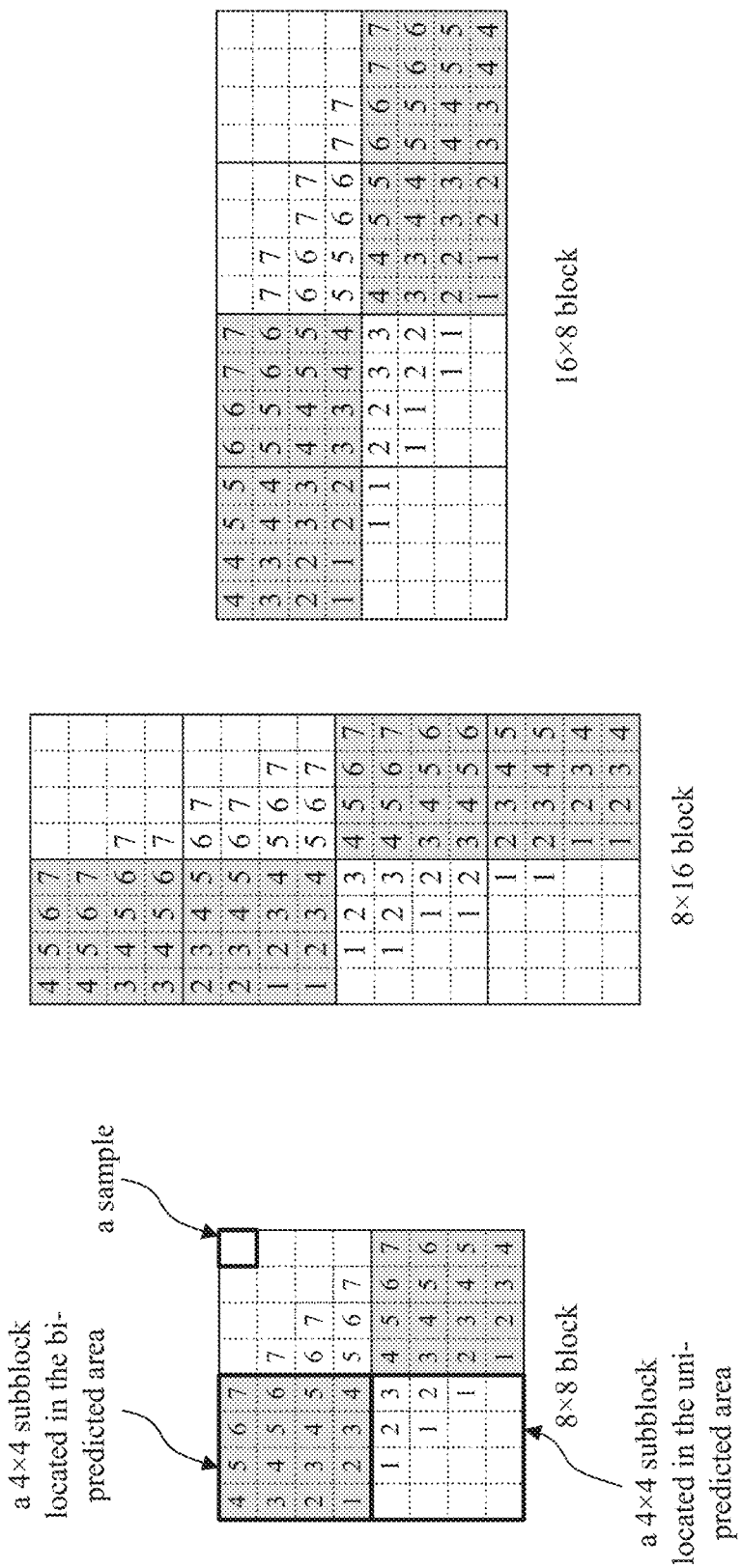
FIG. 8 is a schematic diagram illustrating examples of 4×4 subblocks located in uni-predicted areas and bi-predicted areas, according to some embodiments of the present disclosure.

It is appreciated that when all the samples within a 4×4 subblock are weighted, the 4×4 subblock is considered to be in the bi-predicted area. Otherwise, the 4×4 subblock is considered to be in the uni-predicted area. FIG. 8 illustrates examples of 4×4 subblocks located in the uni-predicted area or bi-predicted area (which is highlighted in gray), according to some embodiments of the present disclosure. The following process may be used to determine whether a 4×4 subblock is located in the bi-predicted area:

if $$\frac{x/4}{r_x} = \frac{y/4}{r_y},$$

the 4×4 subblock is located in the bi-predicted area;
otherwise, the 4×4 subblock is located in the uni-predicted area, where the (x, y) represents the position of the top-left sample of the 4×4 subblock, $r_x$ represents the ratio of the block width to the block height and $r_y$ represents the ratio of the block height to the block width. Specifically, denote block width and block height as W and H, respectively, then: if W>=H, $r_x$=W/H and $r_y$=1; if W<H, $r_x$=1 and $r_y$=H/W. In one example, $r_x$ is set to 1 and $r_y$ is set to 1 for anf 8×8 block. In another example, $r_x$ is set to 4 and $r_y$ is set to 1 for a 32×8 block.

Figure 9:
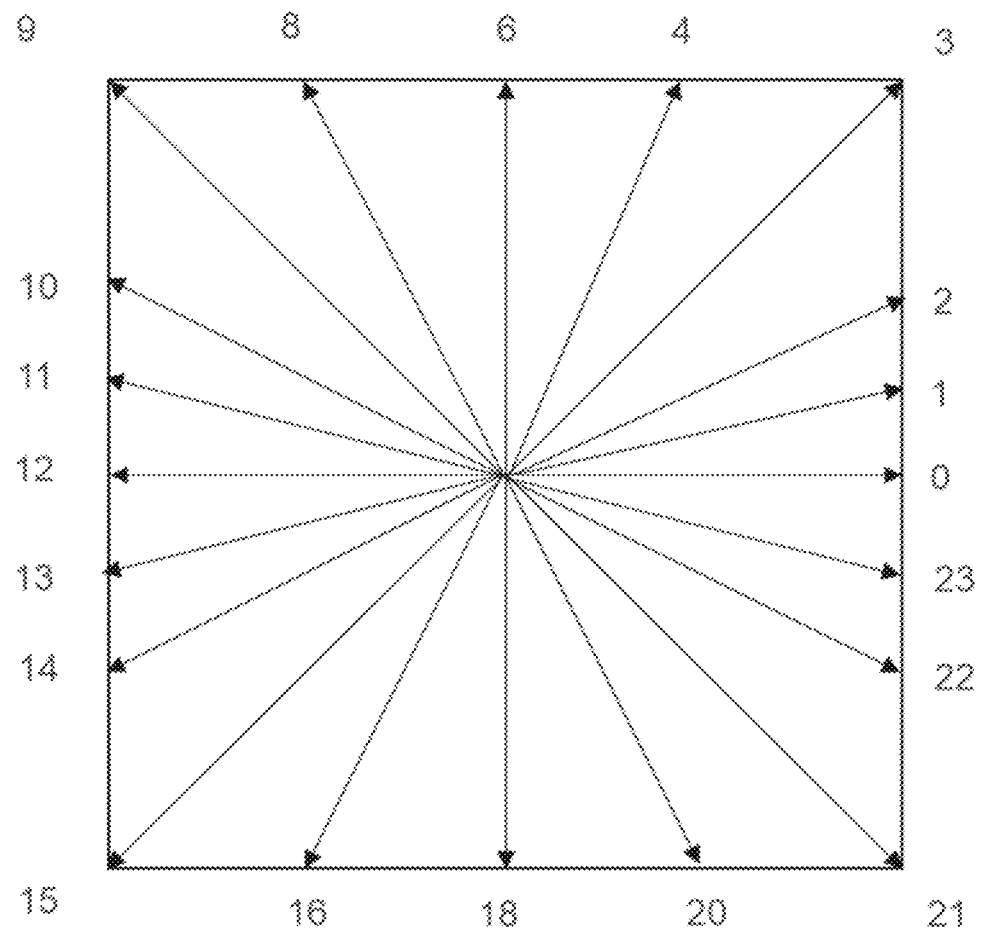
FIG. 9 is a schematic diagram illustrating an example of angle distribution of geometric partition mode (GPM), according to some embodiments of the present disclosure.
Figure 10:
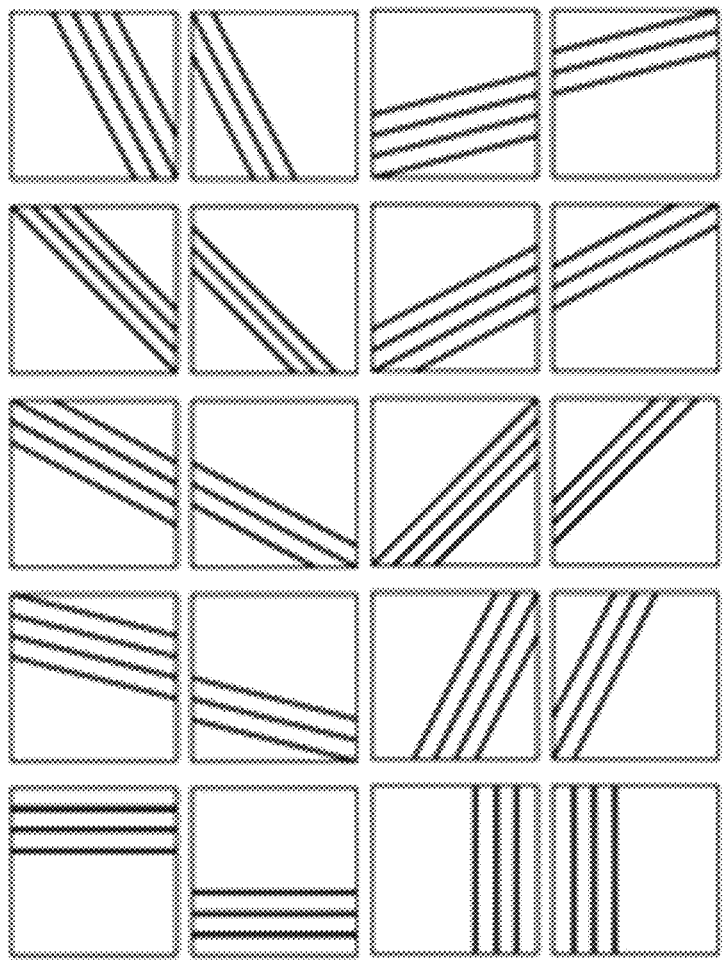
FIG. 10 is a schematic diagram illustrating examples of distance distribution of GPM, according to some embodiments of the present disclosure.

In VVC draft 9, the triangle partition mode can be extended to geometric partition mode (GPM). In the GPM, the number of partition method can be extended from 2 to 64. For example, 20 angles can be supported in GPM, and 4 different distances to the center of the block can be supported for each angle. FIG. 9 is a schematic diagram illustrating an example 900 of angle distribution of GPM, according to some embodiments of the present disclosure. FIG. 10 is a schematic diagram illustrating examples of distance distribution of GPM, according to some embodiments of the present disclosure. Since the distances with distance index 2 of horizontal angles {0, 12} and vertical angles {6, 18} are overlapped with ternary tree split boundaries, they can be removed in GPM.

Problems exist with current design for motion field storage process. In current design, uni-prediction motion vector is stored for 4×4 subblocks located in uni-predicted area, and bi-prediction motion vector which is derived from two uni-prediction motion vectors are stored for 4×4 subblocks located in bi-predicted area. This design is complicated.

For example, for each 4×4 subblock, it may require 2 times comparison when storing motion vectors. One comparison is to determine whether the subblock is located in bi-predicted area. The other comparison is to determine whether the subblock is located in top-right (diagonal split) or top-left (anti-diagonal split) uni-predicted area. In the worst case, total 2016 times comparison are needed for a 128×128 block predicted using triangle partition mode.

In the case when bi-prediction motion needs to be derived (for subblocks that are considered in "bi-predicted area"), when two uni-prediction motion vectors are both from the same reference picture list, one of them is converted to another reference picture list. In this process, reference pictures of uni-prediction motion vectors are examined to determine if the reference pictures appear in another reference picture list. That means, in the worst case, the reference pictures of the uni-prediction motion vectors need to be compared with all the reference pictures in the list. This process may be much complicated.

There is a need to address existing problems with the current design. In some embodiments of present disclosure, the number of comparisons in storing motion vector for a block can be reduced. The motion field storage process can be simplified.

In some embodiments of present disclosure, a subblock with a width or a height larger than 4 is used as the basic unit for motion field storage. For example, 8×8 or larger subblock is used as the basic unit for motion field storage for triangle partition mode.

Figure 11:
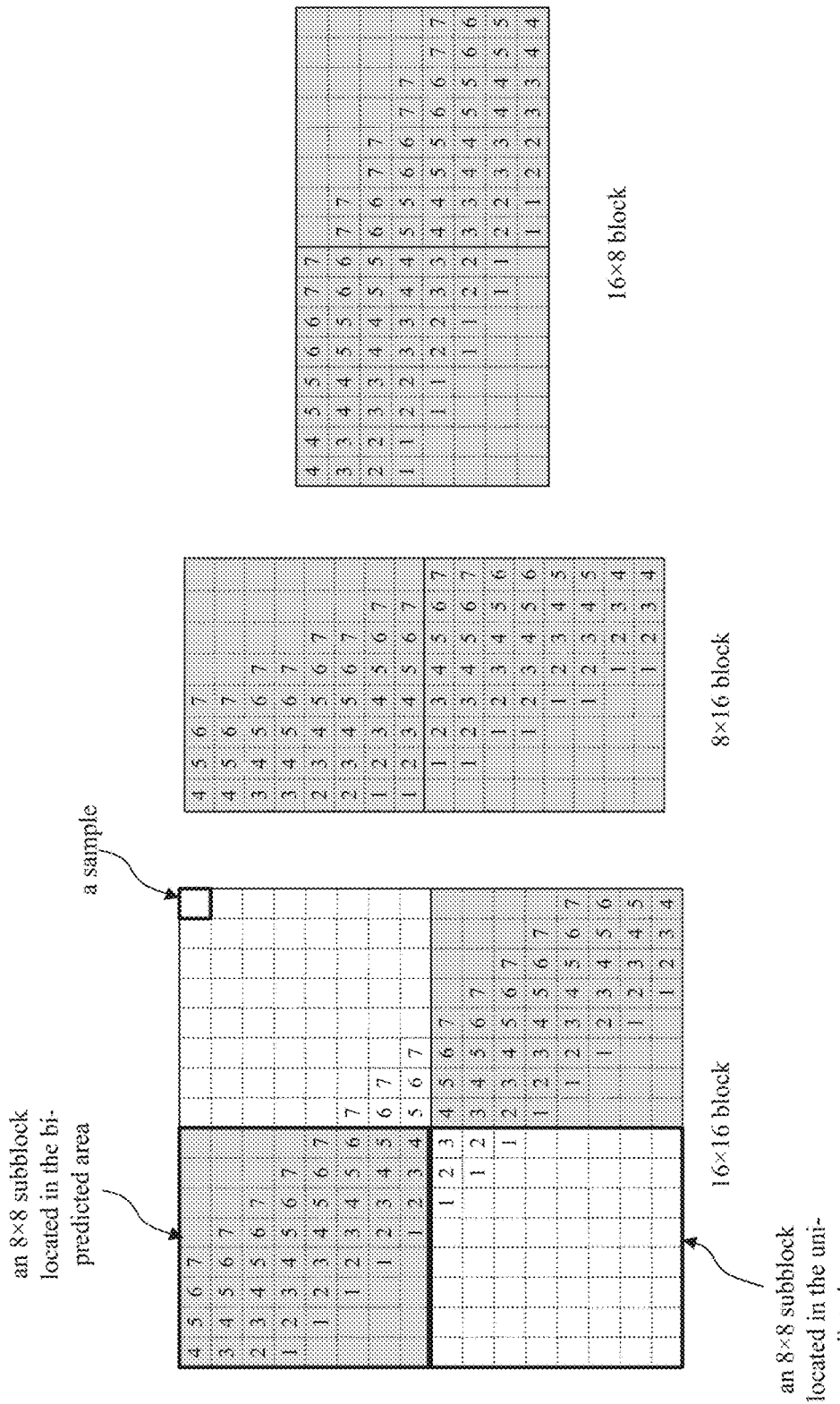
FIG. 11 is a schematic diagram illustrating examples of 8×8 subblocks located in uni-predicted areas and bi-predicted areas, according to some embodiments of the present disclosure.

In an exemplary embodiment, 8×8 subblock is used as basic unit for motion vector storage. A block predicted using triangle partition mode can be split into 8×8 subblocks. Depending on the position of each 8×8 subblock, either uni-prediction or bi-prediction motion vectors are stored. If the 8×8 subblock is located in a bi-predicted area, bi-prediction motion vector is stored. Otherwise, uni-prediction motion vector is stored for a uni-predicted area. It is appreciated that an 8×8 subblock located in the bi-predicted area may contain both weighted and non-weighted samples. FIG. 11 is a schematic diagram illustrating examples of 8×8 subblocks located in the uni-predicted area or bi-predicted area, according to some embodiments of the present disclosure. For example, in the triangle partition mode, the following process is used to determine whether an 8×8 subblock is considered to be in bi-predicted area:

if $$\frac{x/8}{r_x} = \frac{y/8}{r_y},$$

the 8×8 subblock is located in the bi-predicted area;
otherwise, the 8×8 subblock is located in the uni-predicted area, where the (x, y) represents the position of the top-left sample of the 8×8 subblock and ($r_x$, $r_y$) represents the ratio of the block width to the block height.

In an embodiment, a block for which width and height are both larger than or equal to 8 is split into 8×8 subblocks. In another embodiment, a block which width is smaller than 8 is split into 4×8 subblocks. In another embodiment, a block for which height is smaller than 8 is split into 8×4 subblocks.

In the embodiments where 8×8 subblock is used as basic unit, total 496 times comparison are needed for a 128×128 block predicted using triangle partition mode. As a result, 75% of comparison is reduced as compared to the current VVC draft 5 design.

In another exemplary embodiment, 16×16 subblock is used as basic unit for motion vector storage. A block predicted using triangle partition mode can be split into 16×16 subblocks. For example, a block whose width and height are both larger than or equal to 16 is split into 16×16 subblocks. In another example, a block is split into subblock for which width is equal to min(block width, 16) and height is equal to min(block height, 16).

In an exemplary embodiment, M×N subblock is used as basic unit for motion vector storage, wherein M may be equal to N or may not be equal to N. A block predicted using triangle partition mode can be split into M×N subblocks. Depending on the position of each M×N subblock, either uni-prediction or bi-prediction motion vectors are stored. If the M×N subblock is located in a bi-predicted area, bi-prediction motion vector is stored. Otherwise, uni-prediction motion vector is stored for a uni-predicted area. It is appreciated that an M×N subblock located in the bi-predicted area may contain both weighted and non-weighted samples. The following process is used to determine whether a M×N subblock is considered to be in bi-predicted area:
if $$\frac{x/M}{r_x} = \frac{y/N}{r_y},$$

the M×N subblock is located in the bi-predicted area; otherwise, the M×N subblock is located in the uni-predicted area, where the (x, y) represents the position of the top-left sample of the M×N subblock and $(r_x, r_y)$ represents the ratio of the block width to the block height. The $(r_x, r_y)$ is derived as follows:

$$\text{if } \frac{\text{block width}}{M} \geq \frac{\text{block height}}{N}, r_x = \frac{\text{block width}}{M} \Big/ \frac{\text{block height}}{N}$$
$$\text{and } r_y = 1$$
$$\text{if } \frac{\text{block width}}{M} < \frac{\text{block height}}{N}, r_x = 1 \text{ and}$$
$$r_y = \frac{\text{block height}}{N} \Big/ \frac{\text{block width}}{M}$$

In another exemplary embodiment, the size of the subblock for motion vector storage is depending on the block size. When the block width or height is smaller than or equal to M, the size of subblock is (M/2)×(M/2). Otherwise, the size of subblock is M×M. In some embodiments, M can be equal to 8, 16, 32, or the like. For example, when the block width or height is smaller than or equal to 8, the size of subblock is 4×4. Otherwise, the size of subblock is 8×8. This way the motion field of smaller blocks can be stored in finer granularity.

In yet another exemplary embodiment, the size of the subblock for motion vector storage is the same as the block size. In this case, the same motion vector is stored in both the bi-predicted and the uni-predicted area. The same motion vector may be one of two uni-prediction motion vectors for partitions or bi-prediction motion vector derived from the two uni-prediction motion vectors.

FIG. 12 illustrates a flowchart of an exemplary method 1200 for motion field storage, according to some embodiments of the present disclosure. In some embodiments, method 1200 can be performed by an encoder (e.g., encoder 200 of FIG. 2) or performed by one or more software or hardware components of an apparatus (e.g., apparatus 400 of FIG. 4). For example, a processor (e.g., processor 402 of FIG. 4) can perform method 1200. In some embodiments, method 1200 can be implemented by a computer program product, embodied in a computer-readable medium, including computer-executable instructions, such as program code, executed by computers (e.g., apparatus 400 of FIG. 4).

At step 1202, method 1200 can include determining whether a subblock of a block (or a CU) is in a bi-predicted area. The subblock can has a width, a height, or both larger than 4. In some embodiments, at least one of a width and a height of the subblock is equal to or larger than 8. For example, the subblock can be 8×8 subblock, 4×8 subblock, 8×4 subblock, 16×16 subblock, or min(width of the block, 16)×min(height of the block, 16) subblock. In some embodiments, the size of the subblock can be dependent on a size of the block. Method 1200 can be applied to the triangle partition mode or GPM.

In some embodiments, in the triangle partition mode, the subblock is a M×N subblock. Method 1200 can include determining whether $$\frac{x/M}{r_x}$$

is equal to $$\frac{y/N}{r_y},$$

where (x, y) represents a position of a top-left sample of the subblock and $(r_x, r_y)$ represents a ratio of a width of the block to a height of the block. If $$\frac{x/M}{r_x}$$

is determined to be equal to $$\frac{y/N}{r_y},$$

the subblock is in the bi-predicted area. If $$\frac{x/M}{r_x}$$

is determined to be not equal to $$\frac{y/N}{r_y},$$

the subblock is in a uni-predicted area.

At step 1204, method 1200 can include in response to the subblock being determined to be in the bi-predicted area, storing a bi-prediction motion vector. The method 1200 can also include in response to the subblock being determined to be not in the bi-predicted area, storing a uni-prediction motion vector.

In some embodiments, method 1200 can include splitting the block into a plurality of subblocks. In some embodiments, a size of the subblock can be the same as a size of the block. Then, the bi-prediction motion vector can be the same as the uni-prediction motion vector.

In current design for motion field storage process, when two uni-prediction motion vectors for two partitions are both from the same reference picture list, lots of comparisons needs to be performed in order to convert one of two uni-prediction motion vectors to another reference picture list. In some embodiment of present disclosure, the converting process can be removed. Bi-prediction motion vector generation for subblock in bi-predicted area can be simplified. Then, motion vector derivation process for subblocks located in bi-predicted area can be simplified.

In some embodiments, when two uni-prediction motion vectors are from different reference picture lists, then two uni-prediction motion vectors are combined to form the bi-prediction motion vector. Otherwise, one of the two uni-prediction motion vectors is stored for a subblock located in bi-predicted area.

FIG. 13 is a schematic diagram illustrating examples of triangle partition, according to some embodiments of the present disclosure. In one example, the one of the two uni-prediction motion vector is motion vector from top partition, as shown in FIG. 13. In another example, the one of the two uni-prediction motion vector is motion vector from bottom partition, as shown in FIG. 13. In another example, the one of the two uni-prediction motion vector is motion vector from left partition, as shown in FIG. 13. In another example, the one of the two uni-prediction motion vector is motion vector from right partition, as shown in FIG. 13.

In another example, the one of the two uni-prediction motion vector is a motion vector for which reference picture is closer to current picture of current block. For example, denote POC1 and POC2 as picture order count (POC) of reference pictures of top and bottom partitions, respectively. The POC of the current picture is denoted as POC0. If difference between POC0 and POC1 is smaller than difference between POC0 and POC2, motion vector from top partition is stored. Otherwise, motion vector from bottom partition is stored when difference between POC0 and POC1 is bigger than or equal to difference between POC0 and POC2.

In another example, the one of the two uni-prediction motion vectors is a motion vector for which reference picture has higher quality (i.e. lower QP). For example, the QP of reference pictures of top and bottom partitions are denoted as QP1 and QP2, respectively. If QP1 is smaller than or equal to QP2, motion vector from top partition is stored. Otherwise, motion vector from bottom partition is stored.

In another example, the one of the two uni-prediction motion vectors is a motion vector with smaller amount of motion, e.g., abs(mvx0)+abs(mvy0)<=abs(mvx1)+abs(mvy1). The motion vector with smaller amount of motion is stored.

FIG. 14 illustrates a flowchart of an exemplary method 1400 for motion vector generation, according to some embodiments of the present disclosure. In some embodiments, method 1400 can be performed by an encoder (e.g., encoder 200 of FIG. 2) or performed by one or more software or hardware components of an apparatus (e.g., apparatus 400 of FIG. 4). For example, a processor (e.g., processor 402 of FIG. 4) can perform method 1400. In some embodiments, method 1400 can be implemented by a computer program product, embodied in a computer-readable medium, including computer-executable instructions, such as program code, executed by computers (e.g., apparatus 400 of FIG. 4).

At step 1402, method 1400 can include determining whether a first uni-prediction motion vector for a first partition of a block (or a CU) and a second uni-prediction motion vector for a second partition of the block are from a same reference picture list. The first partition and second partition of the block can be triangle partitions or geometric partitions.

At step 1404, method 1400 can include in response to the first uni-prediction motion vector and the second uni-prediction motion vector being determined to be from the same reference picture list, storing one of the first uni-prediction motion vector and the second uni-prediction motion vector for a subblock located in a bi-predicted area of the block. In some embodiments, the stored one of the first uni-prediction motion vector and the second uni-prediction motion vector can be a motion vector from a top partition, a motion vector from a bottom partition, a motion vector from a left partition, a motion vector from a right partition, a motion vector for which a reference picture is closer to a current picture of a current block, a motion vector for which a reference picture has higher quality, a motion vector with a smaller amount of motion, or the like.

In some embodiments, method 1400 can include in response to the first uni-prediction motion vector and the second uni-prediction motion vector being determined to be not from the same reference picture list, combining the first and second uni-prediction motion vectors to form a bi-prediction motion vector and storing the bi-prediction motion vector for a subblock located in the bi-predicted area of the block.

In some embodiments, method 1400 can include determining whether a subblock of a block (or a CU) is in a bi-predicted area. For example, the subblock is a M×N subblock. In the triangle partition mode, method 1400 can include determining whether $$\frac{x/M}{r_x}$$

is equal to $$\frac{y/N}{r_y},$$

where (x, y) represents a position of a top-left sample of the subblock and ($r_x$, $r_y$) represents a ratio of a width of the block to a height of the block. If $$\frac{x/M}{r_x}$$

is determined to be equal to $$\frac{y/N}{r_y},$$

the subblock is in the bi-predicted area. If $$\frac{x/M}{r_x}$$

is determined to be not equal to $$\frac{y/N}{r_y},$$

the subblock is in a uni-predicted area.

In some embodiments, when two uni-prediction motion vectors are from different reference picture lists, two uni-prediction motion vectors are combined to form bi-prediction motion vector. Otherwise, an averaged motion vector of the two uni-prediction motion vectors is stored.

In one example, when reference pictures of the two uni-prediction motion vectors are the same as each other, the two uni-prediction motion vectors are averaged and stored.

In another example, when reference pictures of the two uni-prediction motion vectors are different from each other, the two uni-prediction motion vectors are scaled to the same reference picture and then averaged. For example, denote Mv1 and Mv2 as the motion vectors of top and bottom partitions, respectively. And, denote RefPic1 and RefPic2 as the reference pictures of the top and bottom partitions, respectively. When RefPic1 is not equal to RefPic2, Mv2 is first scaled to RefPic1. Then, an averaged motion vector of Mv1 and the scaled motion vector is stored. In an embodiment, the temporal motion vector scaling process in VVC draft 5 may be used to perform the scaling.

In another example, when reference pictures of the two uni-prediction motion vectors are different from each other, the two uni-prediction motion vectors are averaged and stored regardless of the difference in their reference pictures.

FIG. 15 illustrates a flowchart of another exemplary method 1500 for motion vector generation, according to some embodiments of the present disclosure. In some embodiments, method 1500 can be performed by an encoder (e.g., encoder 200 of FIG. 2) or performed by one or more software or hardware components of an apparatus (e.g., apparatus 400 of FIG. 4). For example, a processor (e.g., processor 402 of FIG. 4) can perform method 1500. In some embodiments, method 1500 can be implemented by a computer program product, embodied in a computer-readable medium, including computer-executable instructions, such as program code, executed by computers (e.g., apparatus 400 of FIG. 4).

At step 1502, method 1500 can include determining whether a first uni-prediction motion vector for a first partition of a block (or a CU) and a second uni-prediction motion vector for a second partition of the block are from a same reference picture list. The first partition and second partition of the block can be triangle partitions or geometric partitions.

At step 1504, method 1500 can include in response to the first uni-prediction motion vector and the second uni-prediction motion vector being determined to be from the same reference picture list, storing an averaged motion vector of the first uni-prediction motion vector and the second uni-prediction motion vector for a subblock located in a bi-predicted area of the block.

In some embodiments, method 1500 can include in response to the first uni-prediction motion vector and the second uni-prediction motion vector being determined to be from the same reference picture list, determining whether a first reference picture of the first uni-prediction motion vector is the same as a second reference picture of the second uni-prediction motion vector. If the first reference picture is determined to be different from the second reference picture, the first uni-prediction motion vector and the second uni-prediction motion vector can be scaled to a first reference picture, and an averaged motion vector of the scaled first uni-prediction motion vector and the scaled second uni-prediction motion vector can be stored.

In some embodiments, method 1500 can also include in response to the first uni-prediction motion vector and the second uni-prediction motion vector being determined to be not from the same reference picture list, combining the first uni-prediction motion vector and the second uni-prediction motion vector to form a bi-prediction motion vector, and storing the bi-prediction motion vector for a subblock located in a bi-predicted area of the block.

In some embodiments, method 1500 can include determining whether a subblock of a block (or a CU) is in a bi-predicted area. For example, the subblock is a M×N subblock. In the triangle partition mode, method 1500 can include determining whether $$\frac{x/M}{r_x}$$

is equal to $$\frac{y/N}{r_y},$$

where (x, y) represents a position of a top-left sample of the subblock and ($r_x$, $r_y$) represents a ratio of a width of the block to a height of the block. If $$\frac{x/M}{r_x}$$

is determined to be equal to $$\frac{y/N}{r_y},$$

the subblock is in the bi-predicted area. If $$\frac{x/M}{r_x}$$

is determined to be not equal to $$\frac{y/N}{r_y},$$

the subblock is in a uni-predicted area.

It is appreciated that some embodiments described above can be implemented in combination with each other. Following are some exemplary embodiments for such combination. It is appreciated that although 8×8 subblock is used as basic unit for motion vector storage in following embodiments, M×N subblock can also be used.

In some embodiments, motion vectors of a CU coded in triangle partition mode or GPM are stored in 8×8 subblocks. Depending on the position of each 8×8 subblocks, either uni-prediction or bi-prediction motion vectors are stored. In triangle partition mode, for example, denote Mv1 and Mv2 as uni-prediction motion vectors for left partition and right partition, respectively. If an 8×8 subblock is located in the uni-predicted area, either Mv1 or Mv2 is stored for that 8×8 subblock. Otherwise, if the 8×8 subblock is located in the bi-predicted area, a bi-prediction motion vector is stored. The bi-prediction motion vector is derived from Mv1 and Mv2 according to the following process:

1. If Mv1 and Mv2 are from different reference picture lists (one from L0 and the other from L1), then Mv1 and Mv2 are simply combined to form the bi-prediction motion vector.
2. Otherwise, if Mv1 and Mv2 are from the same list, only uni-prediction motion Mv2 is stored.

The following process is used to determine whether an 8×8 subblock is considered to be in bi-predicted area:
if $$\frac{x/8}{r_x} = \frac{y/8}{r_y},$$

the 8×8 subblock is located in the bi-predicted area;
otherwise, the 8×8 subblock is located in the uni-predicted area,
where the (x, y) represents the position of the top-left sample of the 8×8 subblock and ($r_x$, $r_y$) represents the ratio of the block width to the block height.

In another embodiment, motion vectors of a CU coded in triangle partition mode or GPM are stored in 8×8 subblocks. Depending on the position of each 8×8 subblock, either uni-prediction or bi-prediction motion vectors are stored. In triangle partition mode, for example, denote Mv1 and Mv2 as uni-prediction motion vectors for top partition and bottom partition, respectively. If an 8×8 subblock is located in the uni-predicted area, either Mv1 or Mv2 is stored for that 8×8 subblock. Otherwise, if the 8×8 subblock is located in the bi-predicted area, a bi-prediction motion vector is stored. The bi-prediction motion vector is derived from Mv1 and Mv2 according to the following process:

1. If Mv1 and Mv2 are from different reference picture lists (one from L0 and the other from L1), then Mv1 and Mv2 are simply combined to form the bi-prediction motion vector.
2. Otherwise, if Mv1 and Mv2 are from the same list, only uni-prediction motion Mv2 is stored.

The following process is used to determine whether an 8×8 subblock is considered to be in bi-predicted area:
if $$\frac{x/8}{r_x} = \frac{y/8}{r_y},$$

the 8×8 subblock is located in the bi-predicted area;
otherwise, the 8×8 subblock is located in the uni-predicted area,
where the (x, y) represents the position of the top-left sample of the 8×8 subblock and ($r_x$, $r_y$) represents the ratio of the block width to the block height.

Figure 16:
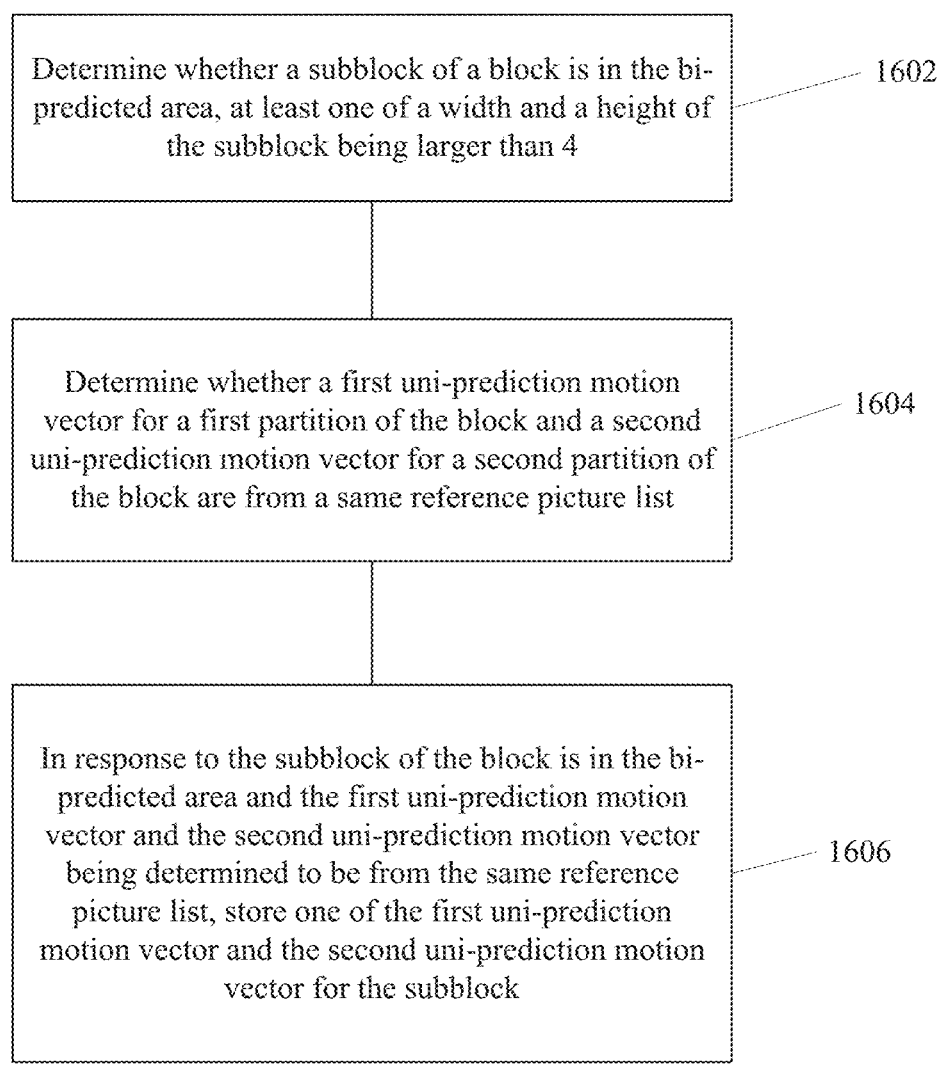
FIG. 16 illustrates a flowchart of another exemplary method for motion field storage, according to some embodiments of the present disclosure.

FIG. 16 illustrates a flowchart of another exemplary method 1600 for motion field storage, according to some embodiments of the present disclosure. In some embodiments, method 1600 can be performed by an encoder (e.g., encoder 200 of FIG. 2) or performed by one or more software or hardware components of an apparatus (e.g., apparatus 400 of FIG. 4). For example, a processor (e.g., processor 402 of FIG. 4) can perform method 1600. In some embodiments, method 1600 can be implemented by a computer program product, embodied in a computer-readable medium, including computer-executable instructions, such as program code, executed by computers (e.g., apparatus 400 of FIG. 4).

At step 1602, method 1600 can include determining whether a subblock of a block (or a CU) is in the bi-predicted area. The subblock can has a width, a height, or both larger than 4. In some embodiments, at least one of a width and a height of the subblock is equal to or larger than 8. For example, the subblock can be 8×8 subblock, 4×8 subblock, 8×4 subblock, 16×16 subblock, or min(width of the block, 16)×min(height of the block, 16) subblock. In some embodiments, the size of the subblock can be dependent on a size of the block.

In some embodiments, the subblock is a M×N subblock. In the triangle partition mode, for example, method 1600 can include determining whether $$\frac{x/M}{r_x}$$

is equal to $$\frac{y/N}{r_y},$$

where (x, y) represents a position of a top-left sample of the subblock and ($r_x$, $r_y$) represents a ratio of a width of the block to a height of the block. If $$\frac{x/M}{r_x}$$

is determined to be equal to $$\frac{y/N}{r_y},$$

the subblock is in the bi-predicted area. If $$\frac{x/M}{r_x}$$

is determined to be not equal to $$\frac{y/N}{r_y},$$

the subblock is in a uni-predicted area.

At step 1604, method 1600 can include determining whether a first uni-prediction motion vector for a first partition of the block and a second uni-prediction motion vector for a second partition of the block are from a same reference picture list. The first partition and second partition of the block can be triangle partitions or geometric partitions.

At step 1606, method 1600 can include in response to the subblock being determined to be in the bi-predicted area and the first uni-prediction motion vector and the second uni-prediction motion vector being determined to be from the same reference picture list, storing one of the first uni-prediction motion vector and the second uni-prediction motion vector for the subblock. In some embodiments, the stored one of the first uni-prediction motion vector and the second uni-prediction motion vector can be a motion vector from a top partition, a motion vector from a bottom partition, a motion vector from a left partition, a motion vector from a right partition, a motion vector for which a reference picture is closer to a current picture of a current block, a motion vector for which a reference picture has higher quality, a motion vector with a smaller amount of motion, or the like.

In some embodiments, method 1600 can include in response to the subblock being determined to be in the bi-predicted area and the first uni-prediction motion vector and the second uni-prediction motion vector being determined to be not from the same reference picture list, combining the first and second uni-prediction motion vectors to form a bi-prediction motion vector and storing the bi-prediction motion vector for the subblock.

In some embodiments, method 1600 can include splitting the block into a plurality of subblocks.

It is appreciated that the disclosed methods (e.g., method 1200 of FIG. 12, method 1400 of FIG. 14, method 1500 of FIG. 15, and method 1600 of FIG. 16) are not limit to the triangle partition, but can be applied to geometric partition. In geometric partition, a block can be split into two geometric-shape partitions. FIG. 17 is a schematic diagram illustrating some examples of geometric partition, according to some embodiments of the present disclosure.

Each geometric partition can be inter-predicted using its own uni-prediction motion vector. The uni-prediction motion vector for each partition can be derived directly from the merge candidate list constructed for extended merge prediction, and the selection of a uni-prediction motion vector from a given merge candidate in the list can be according to the procedure described below.

If geometric partitioning mode is used for the current CU, then a geometric partition index indicating the partition mode of the geometric partition (angle and offset), and two merge indices (one for each partition) are further signalled, as shown in the following Table 1 (emphases in italics):

After predicting each of part of the geometric partition, the sample values along the geometric partition edge are adjusted using a blending processing with adaptive weights. This is the prediction signal for the whole CU, and transform and quantization process can be applied to the whole CU as in other prediction modes. Finally, the motion field of a CU predicted using the geometric partition modes can be stored 4×4 subblocks.

Given a merge candidate index, the uni-prediction motion vector is derived from the merge candidate list constructed for extended merge prediction. FIG. 6 illustrates an exemplary uni-prediction motion vector selection 600 for geometric partition, according to some embodiments of the present disclosure. For a candidate in the list, its LX motion vector with X equal to the parity of the merge candidate index value, is used as the uni-prediction motion vector for geometric partition. These motion vectors are marked with "x" in FIG. 6. In a case that a corresponding LX motion vector does not exist, the L(1−X) motion vector of the same candidate in the extended merge prediction candidate list is used as the uni-prediction motion vector for geometric partition.

After predicting each geometric partition using its own motion, blending is applied to the two prediction signals to derive samples around the partitioning edge. The following weights are used in the blending process: {7/8, 6/8, 5/8, 4/8, 3/8, 2/8, 1/8}. The weights for each sample is described below.

The blending weight for each position of the block are derived based on the distance between individual position and the partition edge. The distance for a position (x, y) to the partition edge are derived as:

$$d(x, y) = (2x + 1 - w)\cos(\varphi_i) + (2y + 1 - h)\sin(\varphi_i) - \rho_j \quad \text{Eq. 1}$$

$$\rho_j = \rho_{x,j}\cos(\varphi_i) + \rho_{y,j}\sin(\varphi_i) \quad \text{Eq. 2}$$

TABLE 1

An exemplary part of merge_data syntax

```
merge_data( x0, y0, cbWidth, cbHeight, chType ) {
...
    if( sps_ciip_enabled_flag && sps_gpm_enabled_flag &&
        slice_type = = B &&
        cu_skip_flag[ x0 ][ y0 ] = = 0 && cbWidth >= 8 && cbHeight >= 8 &&
        cbWidth < ( 8 * cbHeight ) && cbHeight < ( 8 * cbWidth ) &&
        cbWidth <128 && cbHeight < 128 )
        ciip_flag[ x0 ][ y0 ]
    if( ciip_flag[ x0 ][ y0 ] && MaxNumMergeCand > 1 )
        merge_idx[ x0 ][ y0 ]
    if( !ciip_flag[ x0 ][ y0 ] ) {
        merge_gpm_partition_idx[ x0 ][ y0 ]
        merge_gpm_idx0[ x0 ][ y0 ]
        if( MaxNumGpmMergeCand > 2 )
            merge _gpm_idx1[ x0 ][ y0 ]
    }
...
}
```

-continued $$\rho_{x,j} = \begin{cases} 0 & i \% 16 = 8 \text{ or } (i \% 16 \neq 0 \text{ and } h \geq w) \\ \pm(j \times w) >> 2 & \text{otherwise} \end{cases} \quad \text{Eq. 3}$$

$$\rho_{y,j} = \begin{cases} \pm(j \times h) >> 2 & i \% 16 = 8 \text{ or } (i \% 16 \neq 0 \text{ and } h \geq w) \\ 0 & \text{otherwise} \end{cases} \quad \text{Eq. 4}$$

where i,j are the indices for angle and offset of a geometric partition, which depend on the signaled geometric partition index (e.g., merge_gpm_partition_idx[x0][y0]). The indices i and j are derived using the following Table 2:

TABLE 2

Exemplary derivation of indices i and j

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx (i) | 0 | 0 | 2 | 2 | 2 | 2 | 3 | 3 | 3 | 3 | 4 | 4 | 4 | 4 | 5 | 5 |
| distanceIdx (j) | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx (i) | 5 | 5 | 8 | 8 | 11 | 11 | 11 | 11 | 12 | 12 | 12 | 12 | 13 | 13 | 13 | 13 |
| distanceIdx (j) | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx (i) | 14 | 14 | 14 | 14 | 16 | 16 | 18 | 18 | 18 | 19 | 19 | 19 | 20 | 20 | 20 | 21 |
| distanceIdx (j) | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

The signs of $\rho_{x,j}$ and $\rho_{y,j}$ depend on angle index i. The variables (w, h) represent the width and the height of the block. The weights for each part of a geometric partition are derived as following:

$$partIdx = (i \geq 13 \text{ \&\& } i \leq 27) \text{ ? } 0:1$$

$$wIdxL(x, y) = partIdx \text{ ? } 32 + d(x, y):32 - d(x, y)$$

$$w_0(x, y) = \frac{Clip3(0, 8, (wIdxL(x, y) + 4) >> 3)}{8}$$

$$w_1(x, y) = 1 - w_0(x, y)$$

where the weight $w_0(x, y)$ is the weight applied to the sample predicted by the first motion vector deriving using merge_gpm_idx0[x0][y0], and the weight $w_1(x, y)$ is the weight applied to the sample predicted by the second motion vector deriving using merge_gpm_idx1[x0][y0].

Motion vectors of a block coded in geometric partition are stored in 4×4 subblocks. Depending on the position of each 4×4 subblock, either uni-prediction or bi-prediction motion vectors are stored. Denote Mv1 and Mv2 as uni-prediction motion vectors for partition 1 and partition 2, respectively. The Mv1 is derived from the extended merge candidate list shown in FIG. 6 using the first signaled merge index (e.g. merge_gpm_idx0[x0][y0]). Similarly, the Mv2 is derived from the extended merge candidate list using the second signaled merge index (e.g. merge_gpm_idx1[x0][y0]). If a 4×4 subblock is located in the uni-predicted area, either Mv1 or Mv2 is stored for that 4×4 subblock. Otherwise, if the 4×4 subblock is located in the bi-predicted area, a bi-prediction motion vector is stored. The bi-prediction motion vector is derived from Mv1 and Mv2 according to the following process:

1. If Mv1 and Mv2 are from different reference picture lists (e.g., one from L0 and the other from L1), then Mv1 and Mv2 are simply combined to form the bi-prediction motion vector;
2. Otherwise, one of two motion vectors is stored.

In one example, the one of two motion vectors is Mv1. In another example, the one of two motion vectors is Mv2.

Figure 18:
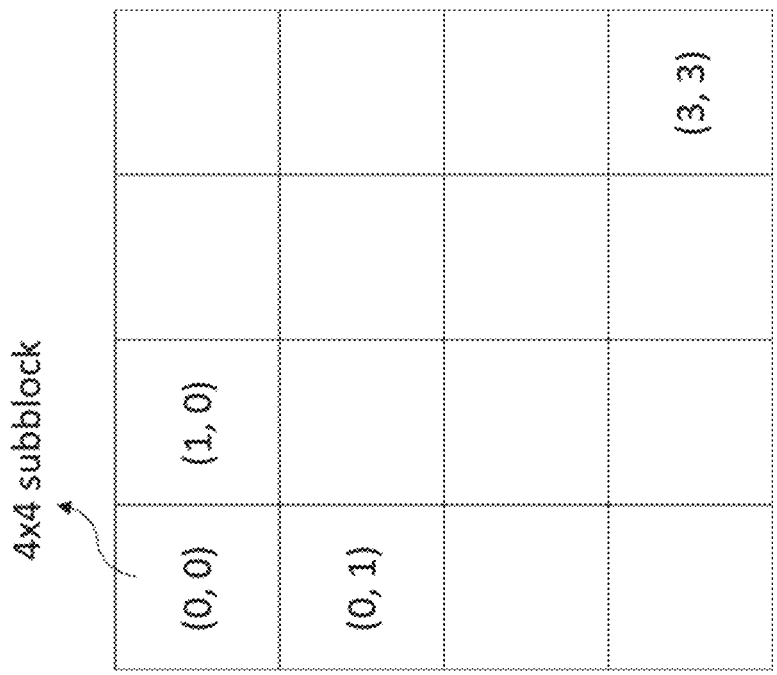
FIG. 18 is a schematic diagram illustrating an example of subblock positions, according to some embodiments of the present disclosure.

To determine whether a 4×4 subblock is located at bi-predicted area, the weight for luma sample located at (4x+2, 4y+2) is used, where (x, y) represents the subblock position in the block, as shown in FIG. 18.

When the absolute value of the weight is smaller than a threshold, the 4×4 subblock is treated as bi-predicted area. Otherwise, the 4×4 subblock is treated as uni-predicted area. The following equation may be used for each 4×4 subblock:

$$sType = abs(motionIdx) < 32 \text{ ? } 2: motionIdx \leq 0 \text{ ? }(1-partIdx): partIdx) \quad \text{Eq. 5}$$

where motionIdx is equal to $d(4x+2, 4y+2)$. When sType is equal to 2, the bi-prediction motion vector can be stored to the 4×4 subblock.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A computer-implemented method, comprising:
determining whether a first uni-prediction motion vector for a first partition of a block and a second uni-prediction motion vector for a second partition of the block are from a same reference picture list; and in response to the first uni-prediction motion vector and the second uni-prediction motion vector being determined to be from the same reference picture list, storing, in a motion field of the block, one of the first uni-prediction motion vector and the second uni-prediction motion vector for a subblock located in a bi-predicted area of the block.

2. The method of clause 1, further comprising:
  in response to the first uni-prediction motion vector and the second uni-prediction motion vector being determined to be not from the same reference picture list,
    combining the first and second uni-prediction motion vectors to form a bi-prediction motion vector; and
    storing, in the motion field of the block, the bi-prediction motion vector for a subblock located in the bi-predicted area of the block.

3. The method of clause 1 or clause 2, wherein the first partition and second partition are two geometric partitions or two triangle partitions.

4. The method of any of clauses 1-3, wherein the stored one of the first uni-prediction motion vector and the second uni-prediction motion vector is one of: a motion vector from a top partition of the block, a motion vector from a bottom partition of the block, a motion vector from a left partition of the block, a motion vector from a right partition of the block, a motion vector for which a reference picture is closer to a target picture corresponding to a target block, a motion vector for which a reference picture has higher quality, and a motion vector with a smaller amount of motion.

5. The method of any of clauses 1-4, wherein the stored one of the first uni-prediction motion vector and the second uni-prediction motion vector is the second uni-prediction motion vector.

6. The method of any of clauses 1-5, wherein the subblock comprises M×N pixels, and at least one of the M and N is larger than 4.

7. The method of any of clauses 1-6, wherein the subblock comprises M×N pixel samples, and at least one of the M and N is equal to or larger than 8.

8. The method of any of clauses 1-7, further comprising:
  determining whether the subblock of the block is in the bi-predicted area.

9. The method of clause 8, wherein the subblock is a M×N subblock, and determining whether the subblock is in the bi-predicted area comprises:
  determining whether $$\frac{x/M}{r_x}$$

is equal to $$\frac{y/N}{r_y},$$

wherein (x, y) represents a position of a top-left pixel sample of the subblock and ($r_x$, $r_y$) represents a ratio of a width of the block to a height of the block; and
  in response to $$\frac{x/M}{r_x}$$

being determined to be equal to $$\frac{y/N}{r_y},$$

determining that the subblock is in the bi-predicted area.

10. The method of any of clauses 1-9, further comprising:
  splitting the block into a plurality of subblocks, each of the plurality of subblocks being one of an 8×8 subblock, a 4×8 subblock, a 8×4 subblock, an 16×16 subblock, and a min(width of the block, 16)×min(height of the block, 16) subblock.

11. An apparatus, comprising:
  a memory configured to store instructions; and
  a processor coupled to the memory and configured to execute the instructions to cause the apparatus to:
    determine whether a first uni-prediction motion vector for a first partition of a block and a second uni-prediction motion vector for a second partition of the block are from a same reference picture list; and
    in response to the first uni-prediction motion vector and the second uni-prediction motion vector being determined to be from the same reference picture list, store, in a motion field of the block, one of the first uni-prediction motion vector and the second uni-prediction motion vector for a subblock located in a bi-predicted area of the block.

12. The apparatus of clause 11, wherein the processor is further configured to execute the instructions to cause the apparatus to:
  in response to the first uni-prediction motion vector and the second uni-prediction motion vector being determined to be not from the same reference picture list,
    combine the first and second uni-prediction motion vectors to form a bi-prediction motion vector; and
    store, in the motion field of the block, the bi-prediction motion vector for a subblock located in the bi-predicted area of the block.

13. The apparatus of clause 11 or clause 12, wherein the first partition and second partition are two geometric partitions or two triangle partitions.

14. The apparatus of clauses 11-13, wherein the stored one of the first uni-prediction motion vector and the second uni-prediction motion vector is one of: a motion vector from a top partition of the block, a motion vector from a bottom partition of the block, a motion vector from a left partition of the block, a motion vector from a right partition of the block, a motion vector for which a reference picture is closer to a target picture corresponding to a target block, a motion vector for which a reference picture has higher quality, and a motion vector with a smaller amount of motion.

15. The apparatus of any of clauses 11-14, wherein the subblock comprises M×N pixels, and at least one of the M and N is larger than 4.

16. The apparatus of any of clauses 11-15, wherein the subblock comprises M×N pixel samples, and at least one of the M and N is equal to or larger than 8.

17. The apparatus of any of clauses 11-16, wherein the processor is further configured to execute the instructions to cause the apparatus to:
  determine whether the subblock of the block is in the bi-predicted area.

18. The apparatus of clause 17, wherein the subblock is a M×N subblock, and the processor is further configured to execute the instructions to cause the apparatus to:
  determine whether $$\frac{x/M}{r_x}$$

is equal to $$\frac{y/N}{r_y},$$

wherein (x, y) represents a position of a top-left pixel sample of the subblock and ($r_x$, $r_y$) represents a ratio of a width of the block to a height of the block; and
  in response to $$\frac{x/M}{r_x}$$

being determined to be equal to $$\frac{y/N}{r_y},$$

determine that the subblock is in the bi-predicted area.

19. The apparatus of any of clauses 11-18, wherein the processor is further configured to execute the instructions to cause the apparatus to:
  split the block into a plurality of subblocks, each of the plurality of subblocks being one of an 8×8 subblock, a 4×8 subblock, a 8×4 subblock, an 16×16 subblock, and a min (width of the block, 16)×min(height of the block, 16) subblock.

20. A non-transitory computer-readable storage medium storing a set of instructions that are executable by one or more processors of a device, wherein the execution of the set of the instructions causes the device to perform:
  determining whether a first uni-prediction motion vector for a first partition of a block and a second uni-prediction motion vector for a second partition of the block are from a same reference picture list; and
  in response to the first uni-prediction motion vector and the second uni-prediction motion vector being determined to be from the same reference picture list, storing, in a motion field of the block, one of the first uni-prediction motion vector and the second uni-prediction motion vector for a subblock located in a bi-predicted area of the block.

21. The non-transitory computer-readable storage medium of clause 20, wherein the execution of the set of the instructions causes the device to further perform:
  in response to the first uni-prediction motion vector and the second uni-prediction motion vector being determined to be not from the same reference picture list,
    combining the first and second uni-prediction motion vectors to form a bi-prediction motion vector; and
    storing, in the motion field of the block, the bi-prediction motion vector for a subblock located in the bi-predicted area of the block.

22. The non-transitory computer-readable storage medium of clause 20 or clause 21, wherein the first partition and second partition are two geometric partitions or two triangle partitions.

23. The non-transitory computer-readable storage medium of any of clauses 20-22, wherein the stored one of the first uni-prediction motion vector and the second uni-prediction motion vector is one of: a motion vector from a top partition of the block, a motion vector from a bottom partition of the block, a motion vector from a left partition of the block, a motion vector from a right partition of the block, a motion vector for which a reference picture is closer to a target picture corresponding to a target block, a motion vector for which a reference picture has higher quality, and a motion vector with a smaller amount of motion.

24. The non-transitory computer-readable storage medium of any of clauses 20-23, wherein the subblock comprises M×N pixels, and at least one of the M and N is larger than 4.

25. The non-transitory computer-readable storage medium of any of clauses 20-24, wherein the subblock comprises M×N pixel samples, and at least one of the M and N is equal to or larger than 8.

26. The non-transitory computer-readable storage medium of any of clauses 20-25, wherein the execution of the set of the instructions causes the device to further perform:
  determining whether the subblock of the block is in the bi-predicted area.

27. The non-transitory computer-readable storage medium of clause 26, wherein the subblock is a M×N subblock, and determining whether the subblock is in the bi-predicted area comprises:
  determining whether $$\frac{x/M}{r_x}$$

is equal to $$\frac{y/N}{r_y},$$

wherein (x, y) represents a position of a top-left pixel sample of the subblock and ($r_x$, $r_y$) represents a ratio of a width of the block to a height of the block; and
  in response to $$\frac{x/M}{r_x}$$

being determined to be equal to $$\frac{y/N}{r_y},$$

determining that the subblock is in the bi-predicted area.

28. The non-transitory computer-readable storage medium of any of clauses 20-27, wherein the execution of the set of the instructions causes the device to further perform:
  splitting the block into a plurality of subblocks, each of the plurality of subblocks being one of an 8×8 subblock, a 4×8 subblock, a 8×4 subblock, an 16×16 subblock, and a min(width of the block, 16)×min(height of the block, 16) subblock.

29. A computer-implemented method, comprising:
   determining whether a subblock is in a bi-predicted area of a block, at least one of a width and a height of the subblock being larger than 4; and
   in response to the subblock being determined to be in the bi-predicted area, storing, in a motion field of the block, a bi-prediction motion vector for the subblock.

30. The method of clause 29, wherein at least one of the width and the height of the subblock is equal to or larger than 8.

31. The method of clause 29 or clause 30, further comprising:
   in response to the subblock being determined to be not in the bi-predicted area, storing, in the motion field of the block, a uni-prediction motion vector for the subblock.

32. The method of any of clauses 29-31, wherein the subblock is a M×N subblock, and determining whether the subblock is in the bi-predicted area comprises:
   determining whether $$\frac{x/M}{r_x}$$

is equal to $$\frac{y/N}{r_y},$$

wherein (x, y) represents a position of a top-left sample of the subblock and ($r_x$, $r_y$) represents a ratio of a width of the block to a height of the block; and
   in response to $$\frac{x/M}{r_x}$$

being determined to be equal to $$\frac{y/N}{r_y},$$

determining that the subblock is in the bi-predicted area.

33. The method of clause 32, further comprising:
   in response to $$\frac{x/M}{r_x}$$

being determined to be not equal to $$\frac{y/N}{r_y},$$

determining that the subblock is in a uni-predicted area.

34. The method of clauses 29-33, further comprising:
   splitting the block into a plurality of subblocks, each of the plurality of subblocks being one of an 8×8 subblock, a 4×8 subblock, an 8×4 subblock, a 16×16 subblock, and a min(width of the block, 16)×min(height of the block, 16) subblock.

35. The method of clauses 29-34, wherein a size of the subblock is dependent on a size of the block.

36. The method of clause 35, further comprising:
   in response to the subblock and the block having a same size, determining that the bi-prediction motion vector is the same as the uni-prediction motion vector.

37. An apparatus, comprising:
   a memory configured to store instructions; and
   a processor coupled to the memory and configured to execute the instructions to cause the apparatus to:
      determine whether a subblock is in a bi-predicted area of a block, at least one of a width and a height of the subblock being larger than 4; and
      in response to the subblock being determined to be in the bi-predicted area, store, in a motion field of the block, a bi-prediction motion vector for the subblock.

38. The apparatus of clause 37, wherein at least one of the width and the height of the subblock is equal to or larger than 8.

39. The apparatus of clause 37 or clause 38, wherein the processor is further configured to execute the instructions to cause the apparatus to:
   in response to the subblock being determined to be not in the bi-predicted area, store, in the motion field of the block, a uni-prediction motion vector for the subblock.

40. The apparatus of any of clauses 37-39, wherein the subblock is a M×N subblock, and the processor is further configured to execute the instructions to cause the apparatus to:
   determine whether $$\frac{x/M}{r_x}$$

is equal to $$\frac{y/N}{r_y},$$

wherein (x, y) represents a position of a top-left sample of the subblock and ($r_x$, $r_y$) represents a ratio of a width of the block to a height of the block; and
   in response to $$\frac{x/M}{r_x}$$

being determined to be equal to $$\frac{y/N}{r_y},$$

determine that the subblock is in the bi-predicted area.

41. The apparatus of clause 40, wherein the processor is further configured to execute the instructions to cause the apparatus to:

in response to $$\frac{x/M}{r_x}$$

being determined to be not equal to $$\frac{y/N}{r_y},$$

determine that the subblock is in a uni-predicted area.

42. The apparatus of clauses 37-41, wherein the processor is further configured to execute the instructions to cause the apparatus to:

split the block into a plurality of subblocks, each of the plurality of subblocks being one of an 8×8 subblock, a 4×8 subblock, an 8×4 subblock, a 16×16 subblock, and a min (width of the block, 16)×min(height of the block, 16) subblock.

43. The apparatus of clauses 37-42, wherein a size of the subblock is dependent on a size of the block.

44. The apparatus of clause 43, wherein the processor is further configured to execute the instructions to cause the apparatus to:

in response to the subblock and the block having a same size, determine that the bi-prediction motion vector is the same as the uni-prediction motion vector.

45. A non-transitory computer-readable storage medium storing a set of instructions that are executable by one or more processors of a device, wherein the execution of the set of the instructions causes the device to perform a method comprising:

determining whether a subblock is in a bi-predicted area of a block, at least one of a width and a height of the subblock being larger than 4; and in response to the subblock being determined to be in the bi-predicted area, storing, in a motion field of the block, a bi-prediction motion vector for the subblock.

46. The non-transitory computer-readable storage medium of clause 45, wherein at least one of the width and the height of the subblock is equal to or larger than 8.

47. The non-transitory computer-readable storage medium of clause 45 or clause 46, wherein the execution of the set of the instructions causes the device to further perform:

in response to the subblock being determined to be not in the bi-predicted area, storing, in the motion field of the block, a uni-prediction motion vector for the subblock.

48. The non-transitory computer-readable storage medium of any of clauses 45-47, wherein the subblock is a M×N subblock, and determining whether the subblock is in the bi-predicted area comprises:

determining whether $$\frac{x/M}{r_x}$$

is equal to $$\frac{y/N}{r_y},$$

wherein (x, y) represents a position of a top-left sample of the subblock and ($r_x$, $r_y$) represents a ratio of a width of the block to a height of the block; and in response to $$\frac{x/M}{r_x}$$

being determined to be equal to $$\frac{y/N}{r_y},$$

determining that the subblock is in the bi-predicted area.

49. The non-transitory computer-readable storage medium of clause 48, wherein the execution of the set of the instructions causes the device to further perform:

in response to $$\frac{x/M}{r_x}$$

being determined to be not equal to $$\frac{y/N}{r_y},$$

determining that the subblock is in a uni-predicted area.

50. The non-transitory computer-readable storage medium of clauses 45-49, wherein the execution of the set of the instructions causes the device to further perform:

splitting the block into a plurality of subblocks, each of the plurality of subblocks being one of an 8×8 subblock, a 4×8 subblock, an 8×4 subblock, a 16×16 subblock, and a min(width of the block, 16)×min(height of the block, 16) subblock.

51. The non-transitory computer-readable storage medium of clauses 45-50, wherein a size of the subblock is dependent on a size of the block.

52. The non-transitory computer-readable storage medium of clause 51, the execution of the set of the instructions causes the device to further perform:

in response to the subblock and the block having a same size, determining that the bi-prediction motion vector is the same as the uni-prediction motion vector.

53. A computer-implemented method, comprising:

determining whether a first uni-prediction motion vector for a first partition of a block and a second uni-prediction motion vector for a second partition of the block are from a same reference picture list; and in response to the first uni-prediction motion vector and the second uni-prediction motion vector being determined to be from the same reference picture list, storing, in a motion field of the block, an averaged motion vector of the first uni-prediction motion vector and the second uni-prediction motion vector for a subblock located in a bi-predicted area of the block.

54. The method of clause 53, further comprising:
in response to the first uni-prediction motion vector and the second uni-prediction motion vector being determined to be not from the same reference picture list,
combining the first uni-prediction motion vector and the second uni-prediction motion vector to form a bi-prediction motion vector; and
storing, in the motion field of the block, the bi-prediction motion vector for a subblock located in a bi-predicted area of the block.

55. The method of clause 53, wherein storing, in a motion field of the block, an averaged motion vector of the first uni-prediction motion vector and the second uni-prediction motion vector for a subblock located in a bi-predicted area of the block comprises:
determining whether a first reference picture of the first uni-prediction motion vector is the same as a second reference picture of the second uni-prediction motion vector; and
in response to the first reference picture being determined to be different from the second reference picture,
scaling the first uni-prediction motion vector and the second uni-prediction motion vector to the first reference picture; and
storing, in the motion field of the block, an averaged motion vector of the scaled first uni-prediction motion vector and the scaled second uni-prediction motion vector.

56. The method of any of clauses 53-55, wherein the first partition and second partition are two geometric partitions or two triangle partitions.

57. An apparatus, comprising:
a memory configured to store instructions; and
a processor coupled to the memory and configured to execute the instructions to cause the apparatus to:
determine whether a first uni-prediction motion vector for a first partition of a block and a second uni-prediction motion vector for a second partition of the block are from a same reference picture list; and
in response to the first uni-prediction motion vector and the second uni-prediction motion vector being determined to be from the same reference picture list, store, in a motion field of the block, an averaged motion vector of the first uni-prediction motion vector and the second uni-prediction motion vector for a subblock located in a bi-predicted area of the block.

58. The apparatus of clause 57, wherein the processor is further configured to execute the instructions to cause the apparatus to:
in response to the first uni-prediction motion vector and the second uni-prediction motion vector being determined to be not from the same reference picture list,
combine the first uni-prediction motion vector and the second uni-prediction motion vector to form a bi-prediction motion vector; and
store, in the motion field of the block, the bi-prediction motion vector for a subblock located in a bi-predicted area of the block.

59. The apparatus of clause 57, wherein storing, in a motion field of the block, an averaged motion vector of the first uni-prediction motion vector and the second uni-prediction motion vector for a subblock located in a bi-predicted area of the block comprises:
determining whether a first reference picture of the first uni-prediction motion vector is the same as a second reference picture of the second uni-prediction motion vector; and
in response to the first reference picture being determined to be different from the second reference picture,
scaling the first uni-prediction motion vector and the second uni-prediction motion vector to the first reference picture; and
storing, in the motion field of the block, an averaged motion vector of the scaled first uni-prediction motion vector and the scaled second uni-prediction motion vector.

60. The apparatus of any of clauses 57-59, wherein the first partition and second partition are two geometric partitions or two triangle partitions.

61. A non-transitory computer-readable storage medium storing a set of instructions that are executable by one or more processors of a device, wherein the execution of the set of instructions causes the device to perform a method comprising:
determining whether a first uni-prediction motion vector for a first partition of a block and a second uni-prediction motion vector for a second partition of the block are from a same reference picture list; and
in response to the first uni-prediction motion vector and the second uni-prediction motion vector being determined to be from the same reference picture list, storing, in a motion field of the block, an averaged motion vector of the first uni-prediction motion vector and the second uni-prediction motion vector for a subblock located in a bi-predicted area of the block.

62. The non-transitory computer-readable storage medium of clause 61, wherein the execution of the set of instructions causes the device to further perform:
in response to the first uni-prediction motion vector and the second uni-prediction motion vector being determined to be not from the same reference picture list,
combining the first uni-prediction motion vector and the second uni-prediction motion vector to form a bi-prediction motion vector; and
storing, in the motion field of the block, the bi-prediction motion vector for a subblock located in a bi-predicted area of the block.

63. The non-transitory computer-readable storage medium of clause 61, wherein storing, in a motion field of the block, an averaged motion vector of the first uni-prediction motion vector and the second uni-prediction motion vector for a subblock located in a bi-predicted area of the block comprises:
determining whether a first reference picture of the first uni-prediction motion vector is the same as a second reference picture of the second uni-prediction motion vector; and
in response to the first reference picture being determined to be different from the second reference picture,
scaling the first uni-prediction motion vector and the second uni-prediction motion vector to the first reference picture; and
storing, in the motion field of the block, an averaged motion vector of the scaled first uni-prediction motion vector and the scaled second uni-prediction motion vector.

64. The apparatus of any of clauses 61-63, wherein the first partition and second partition are two geometric partitions or two triangle partitions.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method, comprising:
   determining whether a first uni-prediction motion vector for a first partition of a block and a second uni-prediction motion vector for a second partition of the block are from a same reference picture list; and
   storing a motion vector for a subblock located in a bi-predicted area of the block,
   wherein when the first uni-prediction motion vector and the second uni-prediction motion vector are determined to be from the same reference picture list:
      the stored motion vector is the second uni-prediction motion vector, and
      wherein the second uni-prediction motion vector is stored for the subblock regardless of whether the second uni-prediction motion vector has a reference picture that is in at least two different reference picture lists.

2. The method of claim 1, further comprising:
   in response to the first uni-prediction motion vector and the second uni-prediction motion vector being determined to be not from the same reference picture list, combining the first and second uni-prediction motion vectors to form a bi-prediction motion vector; and
   storing, in the motion field of the block, the bi-prediction motion vector for a subblock located in the bi-predicted area of the block.

3. The method of claim 1, wherein the first partition and second partition are:
   two geometric partitions, or
   two triangle partitions.

4. The method of claim 1, wherein the stored motion vector is one of: a motion vector from a top partition of the block, a motion vector from a bottom partition of the block, a motion vector from a left partition of the block, a motion vector from a right partition of the block, a motion vector for which a reference picture is closer to a target picture corresponding to a target block, a motion vector for which a reference picture has higher quality, or a motion vector with a smaller amount of motion.

5. The method of claim 1, wherein the subblock comprises M×N pixels, and at least one of the M and N is larger than 4.

6. The method of claim 1, wherein the subblock comprises M×N pixel samples, and at least one of the M and N is equal to or larger than 8.

7. The method of claim 1, further comprising:
   splitting the block into a plurality of subblocks, each of the plurality of subblocks being one of: an 8×8 subblock, a 4×8 subblock, a 8×4 subblock, an 16×16 subblock, or a min(width of the block, 16)×min(height of the block, 16) subblock.

8. An apparatus, comprising:
   a memory configured to store instructions; and
   a processor coupled to the memory and configured to execute the instructions to cause the apparatus to:
      determine whether a first uni-prediction motion vector for a first partition of a block and a second uni-prediction motion vector for a second partition of the block are from a same reference picture list; and
      in response to the first uni-prediction motion vector and the second uni-prediction motion vector being determined to be from the same reference picture list, store, in a motion field of the block, the second uni-prediction motion vector for a subblock located in a bi-predicted area of the block, and
      wherein the second uni-prediction motion vector is stored for the subblock regardless of whether the second uni-prediction motion vector has a reference picture that is in at least two different reference picture lists.

9. The apparatus of claim 8, wherein the processor is further configured to execute the instructions to cause the apparatus to:
   in response to the first uni-prediction motion vector and the second uni-prediction motion vector being determined to be not from the same reference picture list, combine the first and second uni-prediction motion vectors to form a bi-prediction motion vector; and
   store, in the motion field of the block, the bi-prediction motion vector for a subblock located in the bi-predicted area of the block.

10. The apparatus of claim 8, wherein the first partition and second partition are:
two geometric partitions, or
two triangle partitions.

11. The apparatus of claim 8, wherein the stored first uni-prediction motion vector is one of: a motion vector from a top partition of the block, a motion vector from a bottom partition of the block, a motion vector from a left partition of the block, a motion vector from a right partition of the block, a motion vector for which a reference picture is closer to a target picture corresponding to a target block, a motion vector for which a reference picture has higher quality, or a motion vector with a smaller amount of motion.

12. The apparatus of claim 8, wherein the subblock comprises M×N pixels, and at least one of the M and N is larger than 4.

13. The apparatus of claim 8, wherein the subblock comprises M×N pixel samples, and at least one of the M and N is equal to or larger than 8.

14. The apparatus of claim 8, wherein the processor is further configured to execute the instructions to cause the apparatus to:
split the block into a plurality of subblocks, each of the plurality of subblocks being one of: an 8×8 subblock, a 4×8 subblock, a 8×4 subblock, an 16×16 subblock, or a min(width of the block, 16)×min(height of the block, 16) subblock.

15. A non-transitory computer-readable storage medium storing a set of instructions that are executable by one or more processors of a device, wherein the execution of the set of the instructions causes the device to perform:
determining whether a first uni-prediction motion vector for a first partition of a block and a second uni-prediction motion vector for a second partition of the block are from a same reference picture list; and
in response to the first uni-prediction motion vector and the second uni-prediction motion vector being determined to be from the same reference picture list, storing, in a motion field of the block, the second uni-prediction motion vector for a subblock located in a bi-predicted area of the block, and
wherein the second uni-prediction motion vector is stored for the subblock regardless of whether the second uni-prediction motion vector has a reference picture that is in at least two different reference picture lists.

16. The non-transitory computer-readable storage medium of claim 15, wherein the execution of the set of the instructions causes the device to further perform:
in response to the first uni-prediction motion vector and the second uni-prediction motion vector being determined to be not from the same reference picture list, combining the first and second uni-prediction motion vectors to form a bi-prediction motion vector; and
storing, in the motion field of the block, the bi-prediction motion vector for a subblock located in the bi-predicted area of the block.

17. The non-transitory computer-readable storage medium of claim 15, wherein the first partition and second partition are:
two geometric partitions, or
two triangle partitions.

18. The non-transitory computer-readable storage medium of claim 15, wherein the stored first uni-prediction motion vector is one of: a motion vector from a top partition of the block, a motion vector from a bottom partition of the block, a motion vector from a left partition of the block, a motion vector from a right partition of the block, a motion vector for which a reference picture is closer to a target picture corresponding to a target block, a motion vector for which a reference picture has higher quality, or a motion vector with a smaller amount of motion.

19. The non-transitory computer-readable storage medium of claim 15, wherein the subblock comprises M×N pixels, and at least one of the M and N is larger than 4.

* * * * *